J. BECKER.
FOCUSING CAMERA.
APPLICATION FILED SEPT. 24, 1918.
1,307,339.
Patented June 24, 1919.
11 SHEETS—SHEET 1.
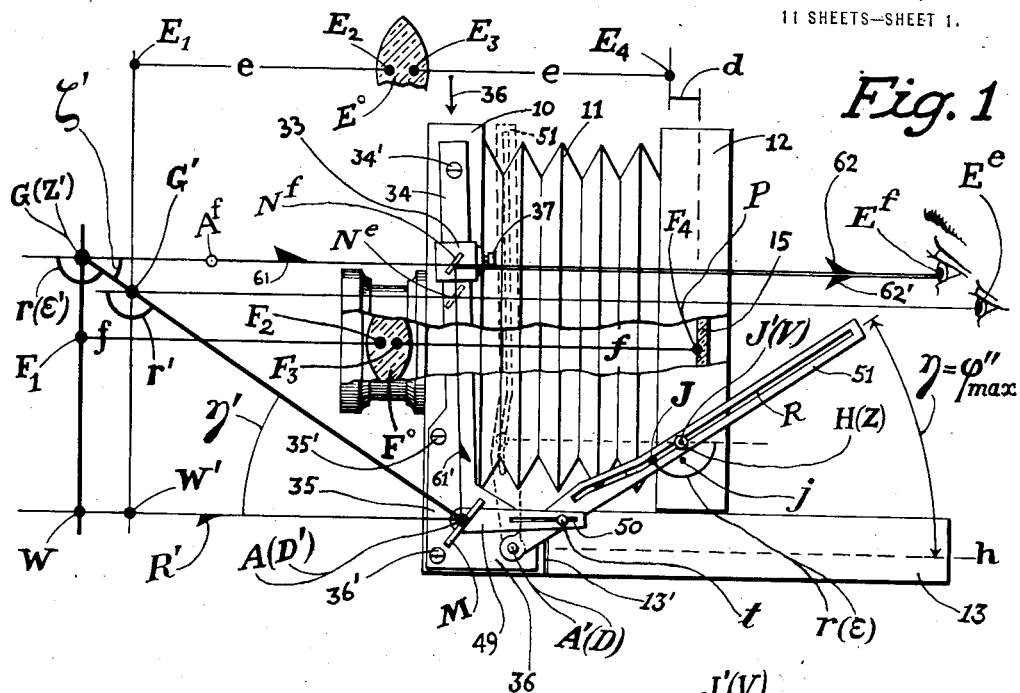
*Fig. 1*
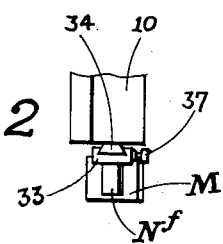
*Fig. 2*
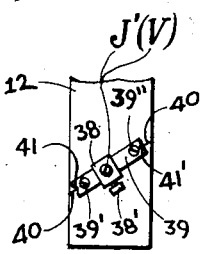
*Fig. 3*
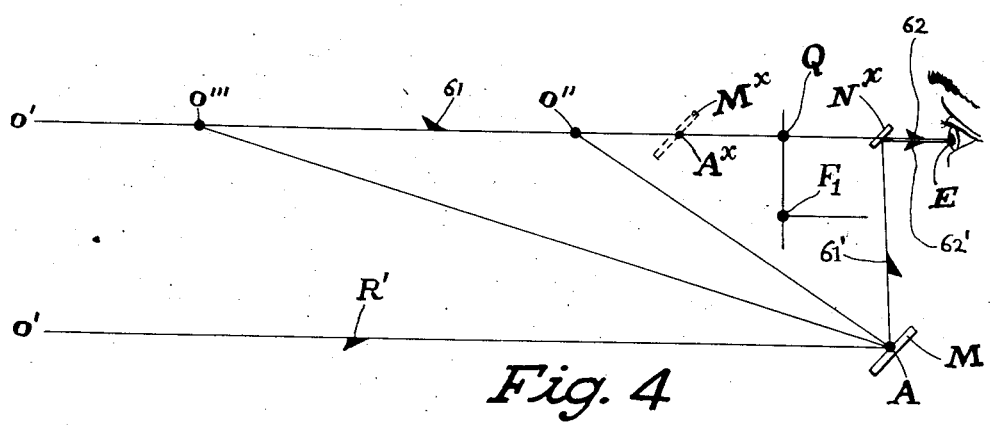
*Fig. 4*
*Fig. 5*
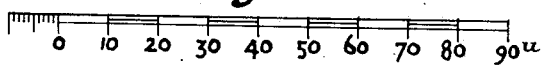
Inventor
Joseph Becker J. BECKER.
FOCUSING CAMERA.
APPLICATION FILED SEPT. 24, 1918.
1,307,339.
Patented June 24, 1919.
11 SHEETS—SHEET 2.
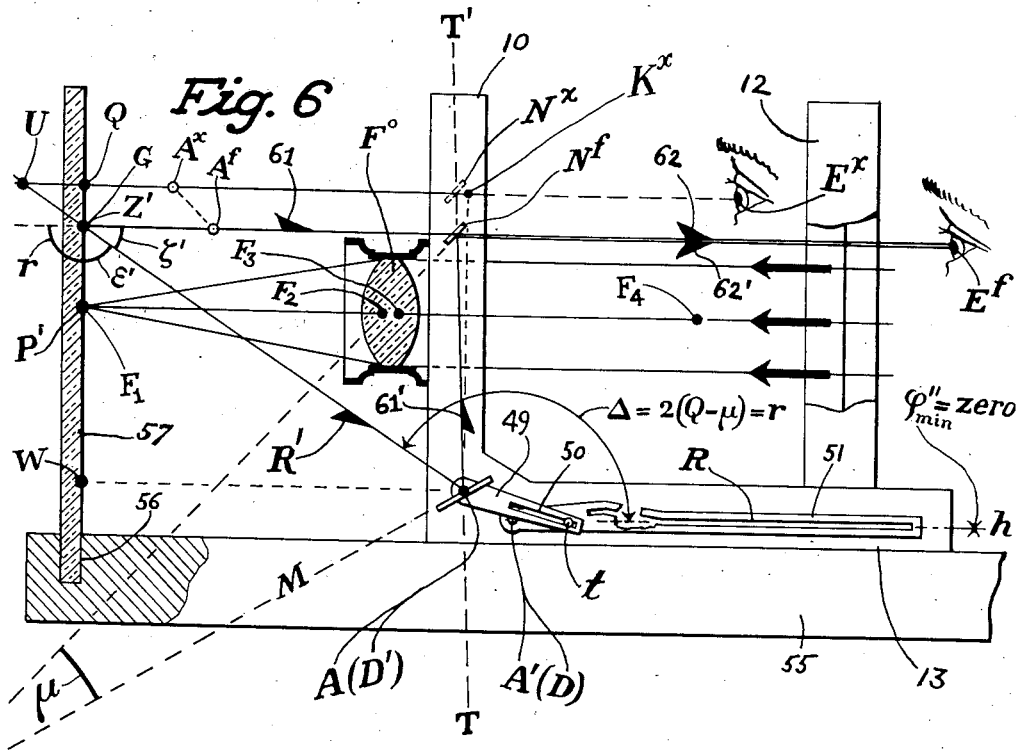
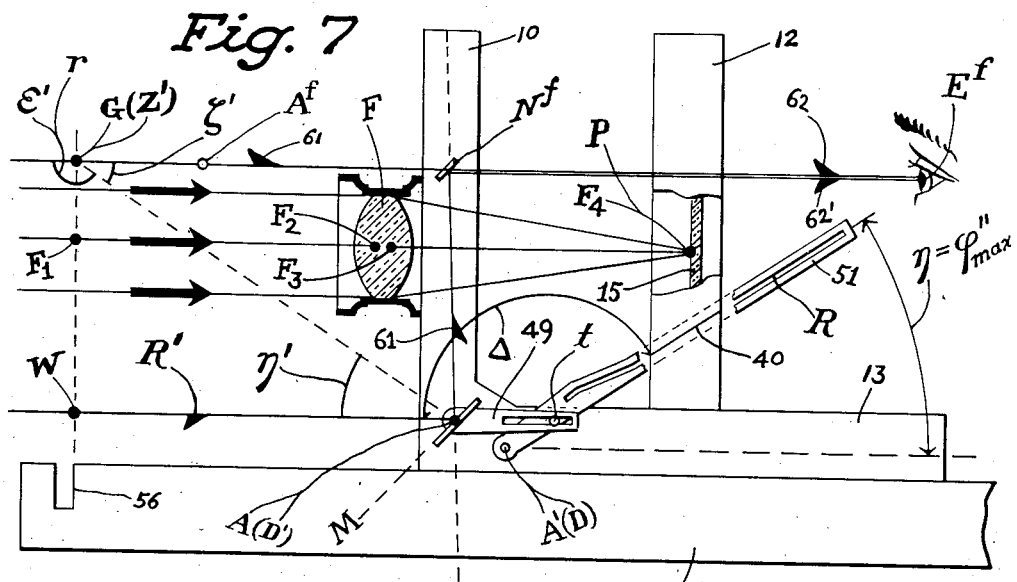
Fig. 8
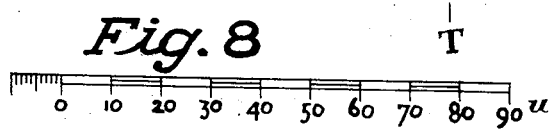
Inventor
Joseph Becker

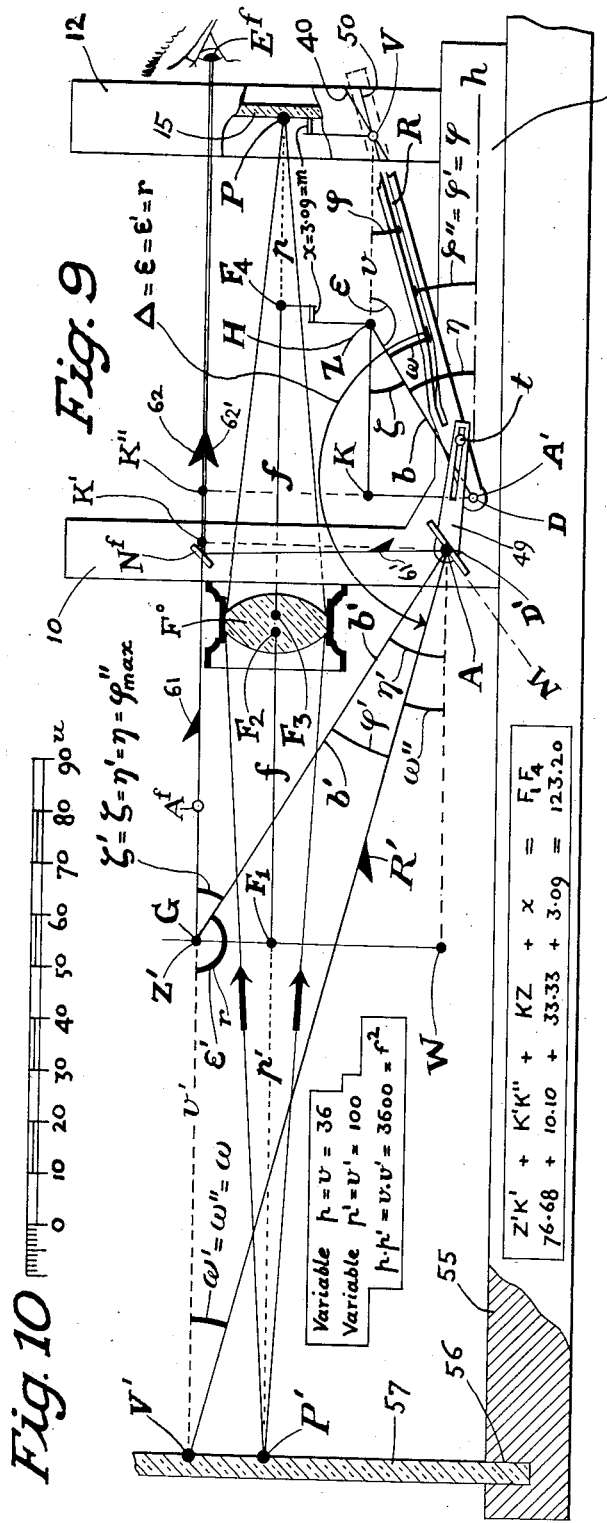

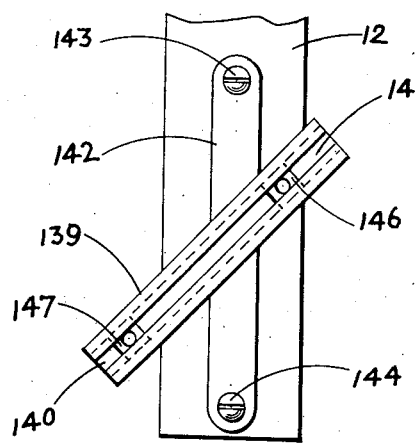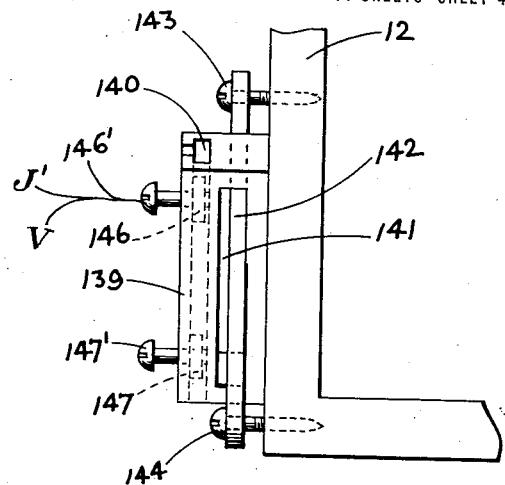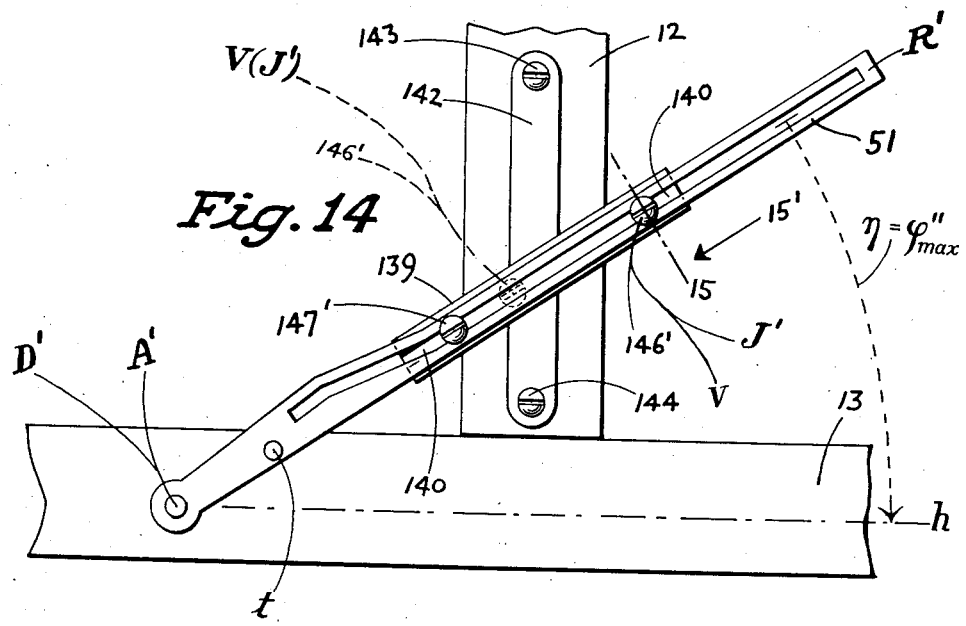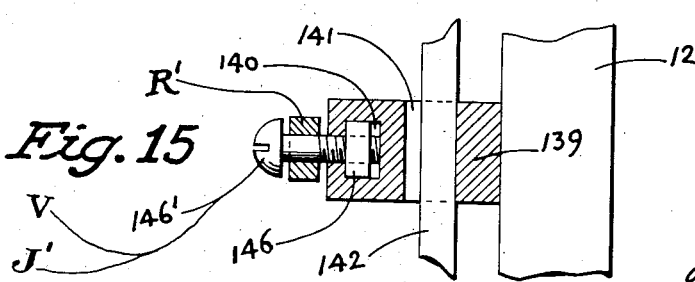

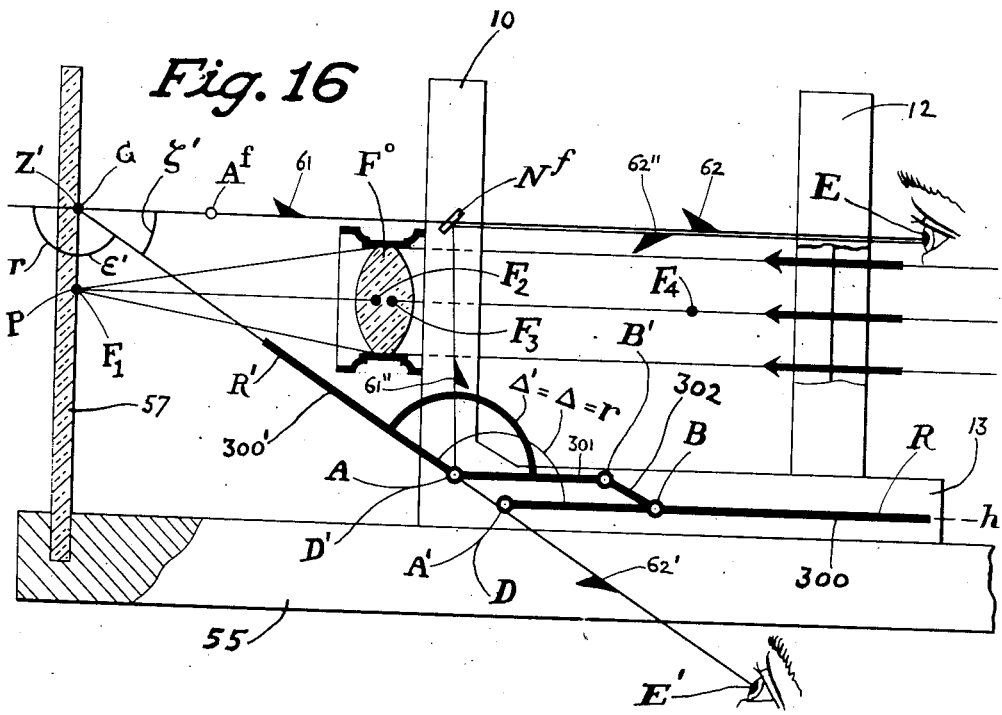
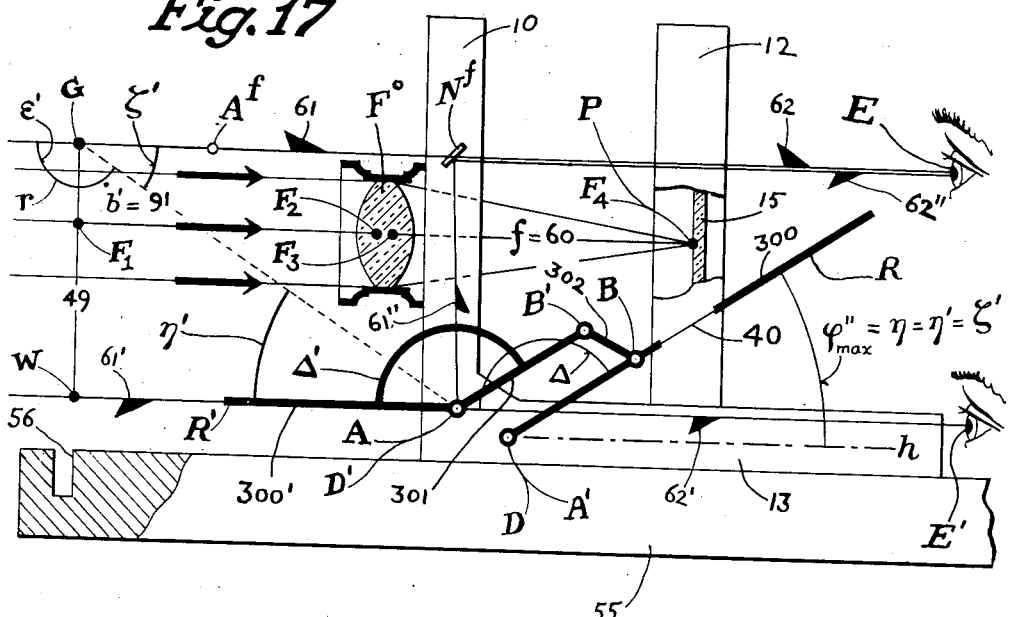

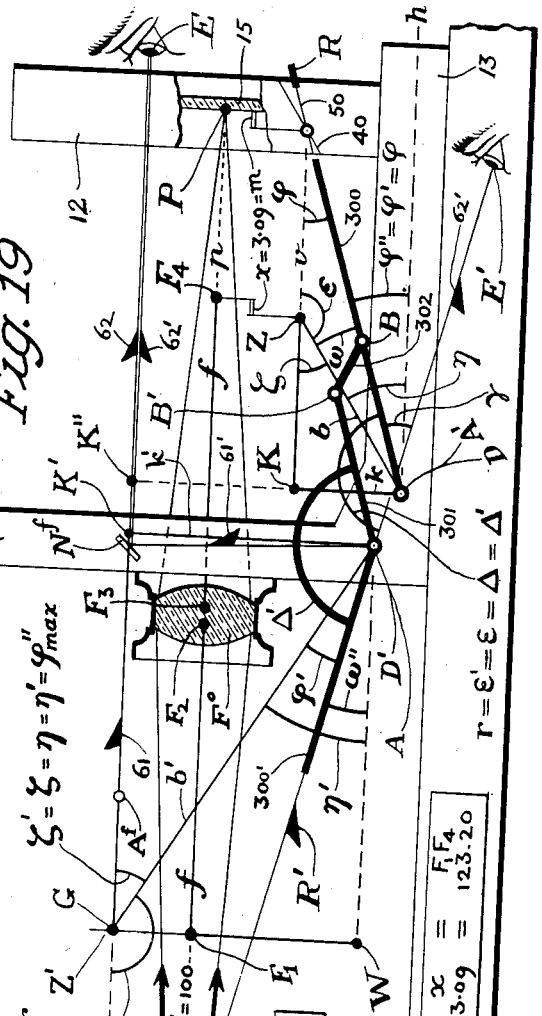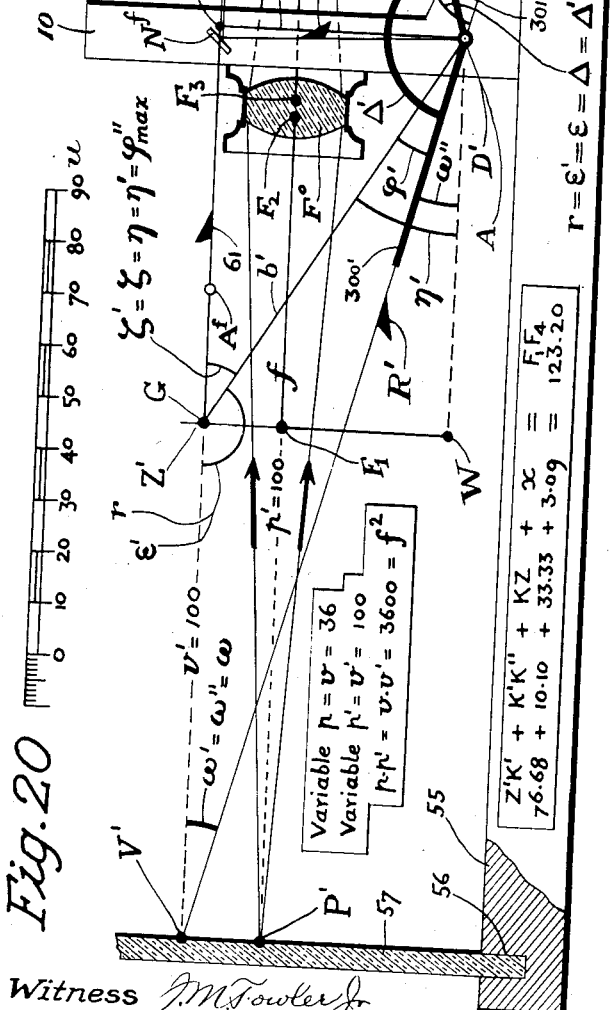

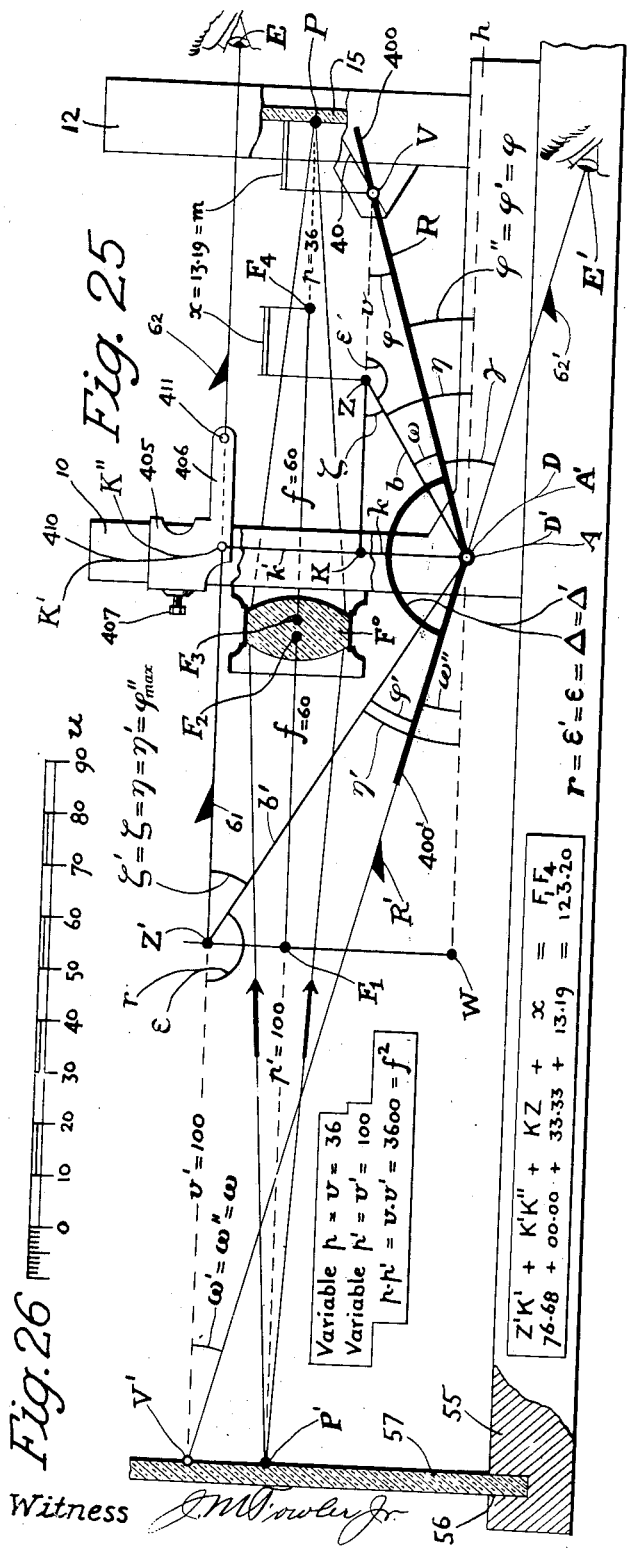

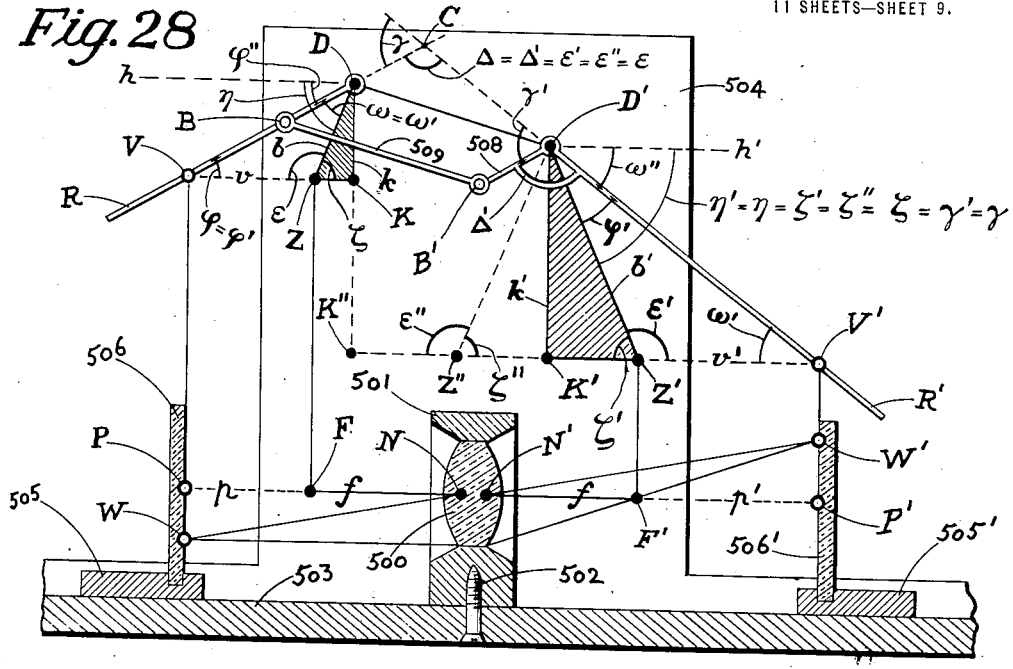

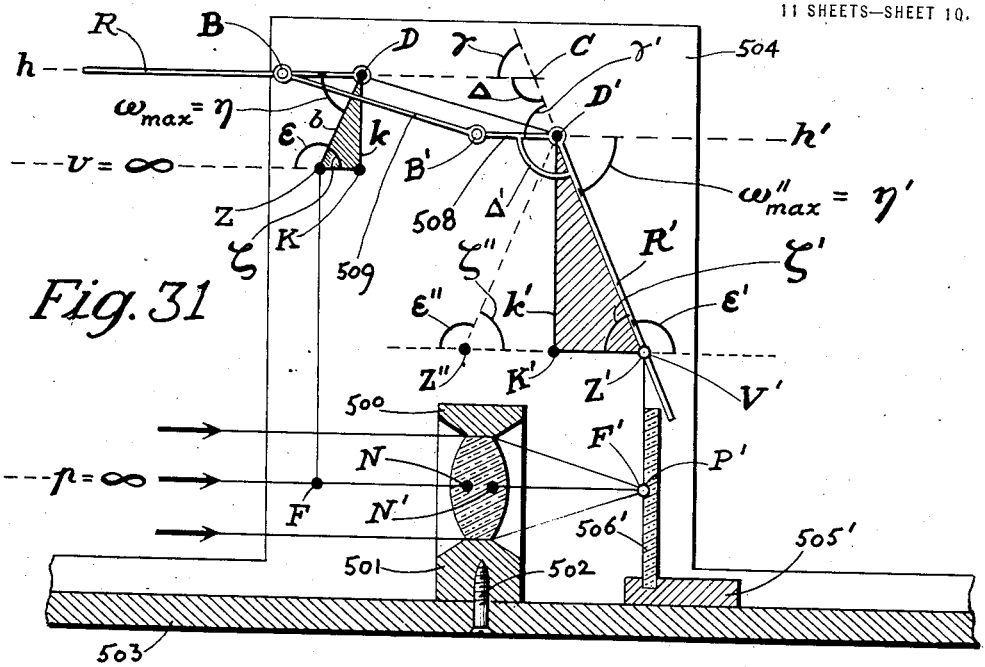
*Fig. 31*
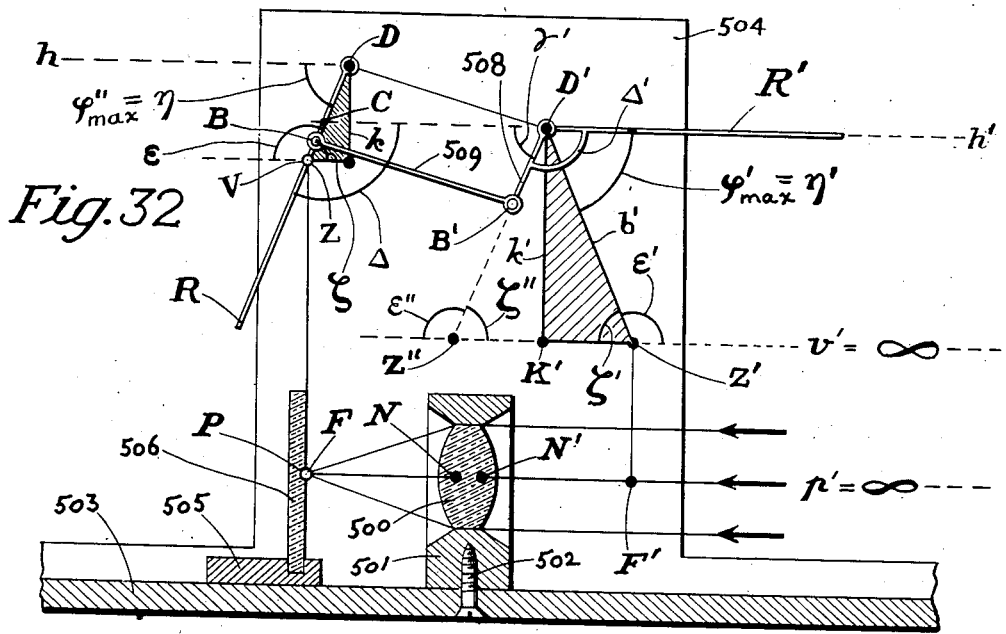
*Fig. 32*
*Fig. 33*

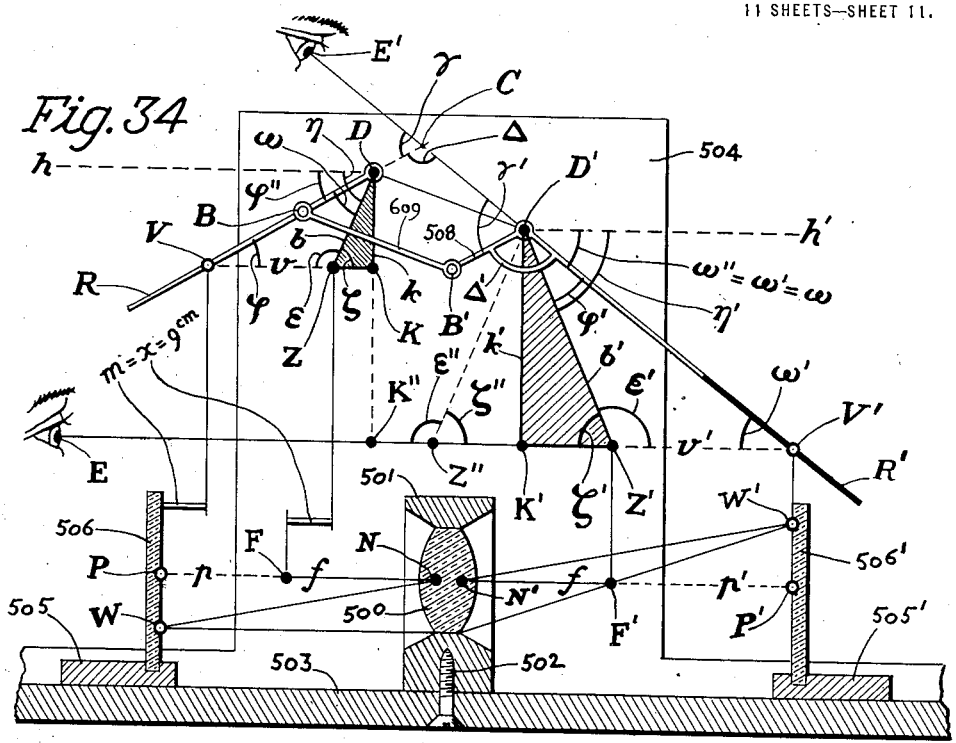
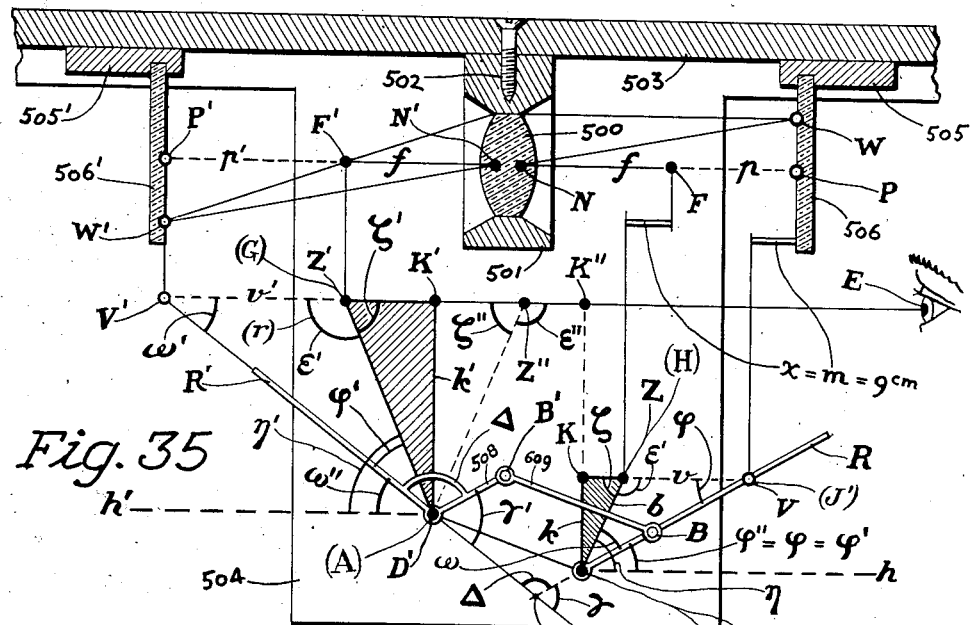

UNITED STATES PATENT OFFICE.

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

FOCUSING-CAMERA.

1,307,339.           Specification of Letters Patent.      Patented June 24, 1919.

Original application filed August 11, 1900, Serial No. 26,647. Divided and application filed April 3, 1916, Serial No. 88,619. This continuation application filed September 24, 1918. Serial No. 255,491.

*To all whom it may concern:*

Be it known that I, JOSEPH BECKER, a citizen of the United States, residing at Washington, in the District of Columbia, have invented a certain new and useful Improvement in Focusing-Cameras, of which the following is a specification.

The present patent application, identified for convenience of reference as Case Bc, continuing Ai or Division Two of A, is a "continuation" of my allowed, herein merged, and therefore hereby abandoned prior application Case Ai, Serial No. 88,619, which was itself filed April 3, 1916, as original "Division Two" of my still earlier Case A, Serial No. 26,647, filed August 11, 1900, and now Patent No. 1,178,474, issued April 4, 1916.

My present Case Bc, and my hereinafter specifically referred to related applications or patents, may all be listed in their filing date or letter name order, as follows: My just mentioned parent case, Case A, now Patent 1,178,474, issued April 4, 1916; Case B, now Patent 1,178,475, issued April 4, 1916; Case I, Serial No. 211,452, filed June 7, 1904, now abandoned but revived partly as Case Af and partly as Case Aj; Case K, now Patent 1,103,342, issued July 14, 1914; Case O, now Patent 1,103,343, issued July 14, 1914; Case T, now Patent 1,142,295, issued June 8, 1915; Case U, now Patent 1,190,214, issued July 4, 1916; Case X, Serial No. 727,548, filed December 24, 1912, abandoned but now reprosecuted as Case Bd; British Patent 29,701, filed December 24, 1912; Case Y, Serial No. 732,488, filed November 20, 1912, now merged in and continued as Case Au; Case Ab, now Patent 1,178,477, issued April 4, 1916; Case Ae, Serial No. 66,371, filed Dec. 11, 1915; Case Af (based on and amplifying a revived part of my said abandoned Case I) now Patent 1,178,478, issued April 4, 1916; the herein merged Case Ai, Serial No. 88,619, filed April 3, 1916, as original "Division Two" of my said Case A, and allowed April 5, 1918; Case Aj (based on and amplifying a second revived part of my said abandoned Case I) Serial No. 88,749, filed April 3, 1916; Case At, Serial No. 143,085, filed January 18, 1917; Case Au, or continuation of my said Case Y, now Patent 1,280,368, issued October 8, 1918; Case Ax or Division 3 of A, now Patent 1,240,788, issued September 18, 1917; my present Case Bc, Serial No. 255,491, filed September 24, 1918; my later Case Bd, Serial No. 258,467, filed October 16, 1918.

My said parent Case A, in Figures 1 to 24, discloses what I have since called, in my said Case Ae, "theoretically exact focusers of the radial cam type"; but in said Case A (page 3, lines 54 to 63) I expressly refrained from making any claim to such devices, because I had not yet discovered the hereinafter disclosed positive method of adjusting mirror $N^3$ in Fig. 19 of said Case A, which adjustment is now to be used in place of the tedious tentative adjustment described in lines 5 to 20 on page 11 of the said Case A, and preferably so as to constitute "adjustment number one" in a series of three entirely independent special adjustments that are used substantially as already described in each of my said prior Cases K, O, T, U, Y, Ab, Ae, Af, At, Au, to secure exact 3-and-hence-all-point correspondence between the focuser and any one of different lenses, without knowing the focal length of the particular lens used, or any other one of its characteristic features.

The present invention therefore consists in the theoretically accurate radial cam optical focusers disclosed in Figs. 1 to 24 of my said Case A; and the focuser of Fig. 19, Case A, with its hereinafter disclosed simpler equivalents, being the most complete, is selected as representative of all for present purposes.

In the accompanying drawings:

Fig. 1, substantially identical with Fig. 19 of my said Case A, is a side view of a camera having its focuser parts fully adjusted and regulated for use with a lens $F^o$ of focal length $f$, all camera and focuser parts being shown set for an object point at left infinity.

Fig. 2 is a detail view showing the special mount of the fixed mirror $N^f$ as it is seen looking downwardly in the direction of the slightly inclined arrow 36, Fig. 1.

Fig. 3 is a side view of the special mount used in my said Case A for pin J' of Fig. 1; but which is now preferably discarded for the mechanically complete form of mount shown in the present Figs. 12 to 15.

Figure 22:
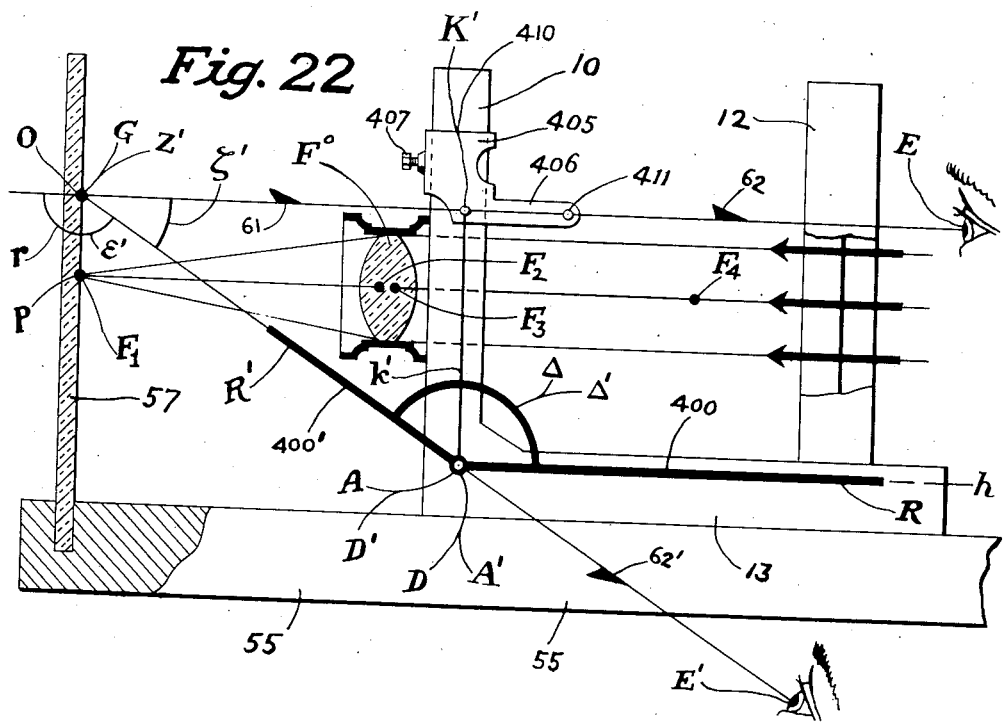

Fig. 4, distorted for clearness, illustrates the tedious, tentative, and herein preferably discarded method of adjustment which was used in my said Case A, to secure exact correspondence between the mirrors and the camera lens for (1) an object point $o'$ at a great distance or infinity; (2) for a second object point $o''$ at close range; and (3) for a third intermediate object point $o'''$; such 3-point correspondence, once obtained in a theoretically exact focuser like the present, being sufficient to secure all-point correspondence, as already explained in my said Case A, more fully in my said Case Ae, and in my said other Cases K, O, T, U, Y, Ab, Af, Ai, At, Au; that is to say, as fully explained in all of my above-enumerated cases excepting Case B and Case Ax, which only make slight references to a theoretically exact form of focuser.

Fig. 5 is a scale of parts in Fig. 1, one hundred parts long, with each part (abbreviated as $u$ for unit) representing about 3 millimeters in the finished structure, but appearing, on the original 10-by-15 inch bristol-board application drawings, as one millimeter; and, therefore, all dimensions hereinafter given, after allowing for variations produced by dampness in paper, may easily be verified with this Fig. 5 scale and with a metric rule, not only on the present drawings, but in Fig. 1 of my said herein merged Case Ai, and on the original Fig. 19 of my said Case A, both of which are kept accessible to the public, in the archives of the Patent Office.

Fig. 6 is a semi-diagrammatic representation of the Fig. 1 camera as it appears immediately after completion of the present "new adjustment number one" which is made on right-hand infinity, and which serves to locate the normally stationary mirror in its proper position $N^t$, quickly, positively, and in such manner that its position will not require any subsequent alteration.

Fig. 7 is a semi-diagrammatic representation of the Fig. 1 camera as it appears immediately after completion of the present "new adjustment number two," which is made on left-hand infinity as already described in my said Case A, and which serves to determine the rectilinear locus 40 of the image frame pintle J'.

Fig. 8 is a scale for Figs. 6 and 7, similar to the $u$ unit scale of Fig. 5 described above.

Fig. 9 is a semi-diagrammatic representation of the Fig. 1 camera as it appears immediately after completion of the present "new adjustment number three" which is made with the finite conjugate distances $p'$ and $p$, and which serves to determine, on locus 40 of Fig. 7, the exact position V of pintle J'.

Fig. 10 is a scale for Fig. 9, similar to the $u$ unit scales of Figs. 5 and 8.

Fig. 11 is a table of the fundamental dimensions in the present Fig. 1 camera, and therefore also in the Fig. 19, Case A, camera; all values that are given in the table being the result, either direct or calculated, of measurements made with a metric rule on the previously referred to original 10-by-15 inch bristol-board drawing of my said Case A, whose fundamental dimensions were drawn in exact proportion, hence also angle-true, though not to any stated scale; the black quadrant means: for lens $F^o$.

Fig. 12, on a scale twice as large as that of Fig. 1, is a side view of my present preferred and mechanically complete form of mount for pintle J', to be used in place of the mount shown in the present Fig. 3, or in place of that shown in Fig. 21 of my said Case A, with the object of avoiding all marks, such as line 40 seen in present Figs. 7 and 9, or line 50 seen in present Fig. 9, so that all adjustments shall be mechanically complete in every particular.

Fig. 13 is a rear end elevation of the same after insertion of the two bolts 146', 147'.

Fig. 14 is a side view, corresponding to Fig. 7, showing how the said mount of Figs. 12 and 13, is automatically set during "adjustment number two," at its proper height and inclination on frame 12, that is to say, in proper position for clamping.

Fig. 15, on a scale twice as large as that of Figs. 12 to 14, is a sectional view taken on plane 15 of Fig. 14 looking in the direction of arrow 15'.

Figs. 16, 17, 18, 19, 20, and 21, corresponding respectively to Figs. 6, 7, 8, 9, 10, and 11, show a simplified form of optical focuser which is derived from the Fig. 1 type, without changing any of the fundamental dimensions, simply by substituting a direct radial sighting arm AR' in place of, and rotating twice as fast as the lower pivoted mirror M. Mirror $N^t$ is retained to serve as a peep in combination with the image $A^t$ of pin A acting as a bead to determine the direct horizontal sight line $N^tA^tG$.

Figs. 22, 23, 24, 25, 26 and 27, also corresponding respectively to Figs. 6, 7, 8, 9, 10 and 11, show a still simpler form in which (1) the two radial arms AR, AR' of Figs. 16, 17 and 19 are mounted on the same pivot A, so that they may be rigidly connected; and (2) the upper mirror of the same Figs. 16, 17, 19, is replaced by a plain, vertically adjustable but constantly horizontal sighting arm 406.

Fig. 28, corresponding to Fig. 3 of my said Cases K and O, also to Fig. 5 of my said Case T, and especially to Figs. 6 and 8 of my said Case U, is a semi-diagrammatic representation of the most easily understood form of radial cam focuser, the same being wholly mechanical, with its two radial cam terminals V and V' directly and respectively mounted in the two structurally represented conjugate planes P and P' of the lens 500.

Fig. 29 represents, at the same scale as Fig. 28, a centimeter scale which is to be used in measuring all the fundamental linear dimensions of Fig. 28.

Fig. 30 is a table of the fundamental linear and of the fundamental angular dimensions in Fig. 28.

Fig. 31 shows the camera of Fig. 28 as it would appear if its left conjugate plane P could be shifted all the way to left infinity.

Fig. 32 shows the same camera of Fig. 28 as it would appear if its right-hand conjugate plane P' could be shifted all the way to right-hand infinity.

Fig. 33 represents a centimeter scale to be used in measuring all fundamental linear dimensions in Figs. 31 and 32.

Fig. 34 shows a more general form of mechanical focuser, derived from that of Fig. 28, without changing any of the fundamental dimensions, by simply translating the left-hand section of the focusing gear in Fig. 28, horizontally to the right, through a distance of nine centimeters; such shift being structurally represented by the nine-centimeter bar $m$, the nine-centimeter bar $x$, and a new link 609, shorter than link 509 of Fig. 28.

Fig. 35 is a two-sight optical focuser of the same type as that seen in Fig. 19, but derived from the mechanical focuser of Fig. 34 by simply inverting the structure of said Fig. 34, without changing any of its dimensions, but after having substituted a sighting arm or alidade D'R' for the mechanical radial cam D'R'.

Fig. 36 represents a centimeter scale to be used in measuring the fundamental linear dimensions in Figs. 34 and 35, such dimensions being the same as those listed in Fig. 30 for Fig. 28; excepting that K"K' is now 30 instead of 39 cm.

The principal novel features of my present invention are: first, that the properly adjusted device, in all forms herein shown or referred to, is theoretically exact for all object distances, and is nevertheless capable of an infinite number of variations, in arrangement and proportion, either with or without mirrors, to suit the special requirements of any given case, because the pivots A and A' may each be located independently, in any arbitrarily preferred positions on the lens frame of the camera; secondly, that the novel, quick, positive, and accurate method of adjustment herein disclosed does not necessarily involve any change whatever in the structure or proportions of the Fig. 19, Case A, camera as first disclosed in 1900, although in the preferred form it does involve the slight change in structure seen in Figs. 12 to 15; thirdly, that the device has special features which permit of either folding the camera for transportation or of opening it up for use, without paying any attention to the mechanical connections in the focuser, as such connections are adapted to recover their proper relations automatically whenever the camera is opened up for use.

*Camera of Figs. 1 to 5.*

The camera of Figs. 1 to 5 is identically the same as that of Figs. 19 to 22 of my said Case A, and it will be described in substantially the same terms, both structurally and in its adjustments, so that there shall be no doubt whatever that the present additional disclosures are simply complementary, and do not involve the slightest departure in principle.

The camera proper comprises an upright rigid frame 10 which supports a camera lens $F^o$, whose four cardinal planes pass through the points $F_1$, $F_2$, $F_3$, $F_4$; or which supports, in place of lens $F^o$, any other lens, such as the diagrammatically represented lens $E^o$, whose four cardinal planes would pass through the differently spaced set of cardinal points $E_1$, $E_2$, $E_3$, $E_4$.

The lens frame 10 has a horizontal extension 13 hinged at 13', for folding, but normally adapted to form a slideway for a block that supports the movable image frame 12. A bellows 11 is used to establish an extensible light proof connection between the stationary lens frame 10 and the movable image frame 12.

The focuser comprises a metallic base plate 34, 35, 36, fastened to the lens frame 10 by three screws 34', 35', 36'. The upper part 34 of this base plate is formed as a dovetail rail, Fig. 2, to serve as a guide for a small carriage 33 which supports the normally stationary eye mirror or peep $N^t$. This mirror $N^t$ may be fixed at any desired elevation on rail 34 by tightening the clamp screw 37. Fig. 1 shows it in two positions distinguished as (1) position $N^e$, which would be correct for the unmounted lens $E^o$; and (2) position $N^t$ which is correct for the mounted lens $F^o$.

The dovetail rail element 34 of the focuser base should preferably be parallel to the upright 10, but it is here shown a little inclined to emphasize the fact that it does not have to be upright to secure correct operation. Mirror $N^t$, however, must be fixed at the proper inclination to bisect the angle that the rail 34 forms with the horizontal line of sight $E^tN^tA^t$.

The lower expanded part 35, 36, of the focuser base plate has a pivot or pivot bearing A for a pivoted mirror M, whose rigidly connected arm 49 is radially slotted at 50 to engage a pintle $t$ carried by the radial cam arm 51 which is pivoted at $A'$ to the lower part 36 of the metallic focuser base plate. The distance $A't$ and the distance $A'A$ are invariable, and they are made equal so as to form, with the variable base $At$, a variable but always isosceles triangle $AtA'$ in which the obtuse angle $A'$ necessarily equals two right angles minus the sum of the two equal angles $A$ and $t$, or minus twice the acute angle at $A$. The angular motions of arm $A't$ or 51 must therefore be exactly twice as large as those of the mirror arm 49; that is to say, twice as large as the angular motions of the mirror M. A more detailed proof of this proposition is given in lines 59 to 83, page 6, and Figs. 4 and 5 of my said Case A, where all possible variations in the position of a similar pintle $p$, on an arm $D^4$, are fully discussed.

Arm 51 has a slot R which is mainly radial, to serve as a radial cam, for focusing, but which is bent as shown at its lower, and not otherwise used, end to insure that the arm 51 shall automatically assume the proper upright or folded-up position, shown in dotted lines, when the image frame 12 has been brought up against the lens frame 10 in folding the camera.

The radial slot R of arm 51 engages a pin $J'$ which is adjustably mounted on the image frame 12, as shown in Fig. 3, where pin $J'$ is seen to be fixed on a carriage 38. This carriage has a clamp screw 38' for clamping it in any desired longitudinal position on the guide rail 39, which is itself fastened to the image frame by means of two screws 39' and 39''.

The ends of the guide rail 39 are nicked centrally at 41 and 41' to assist in properly locating the guide rail 39 with reference to the mark 40, which is traced on the image frame 12 in the process of adjustment described farther on.

The focuser is shown regulated and adjusted for use with the mounted lens $F^o$ which has its four cardinal points at $F_1$, $F_2$, $F_3$, $F_4$. The principal foci are at $F_1$ and $F_4$, while the two nodal points are at $F_2$ and $F_3$, determining a focal length $F_1F_2$, or $F_3F_4$, or $f$ equal to 60 units of the scale in Fig. 5.

Figure 23:
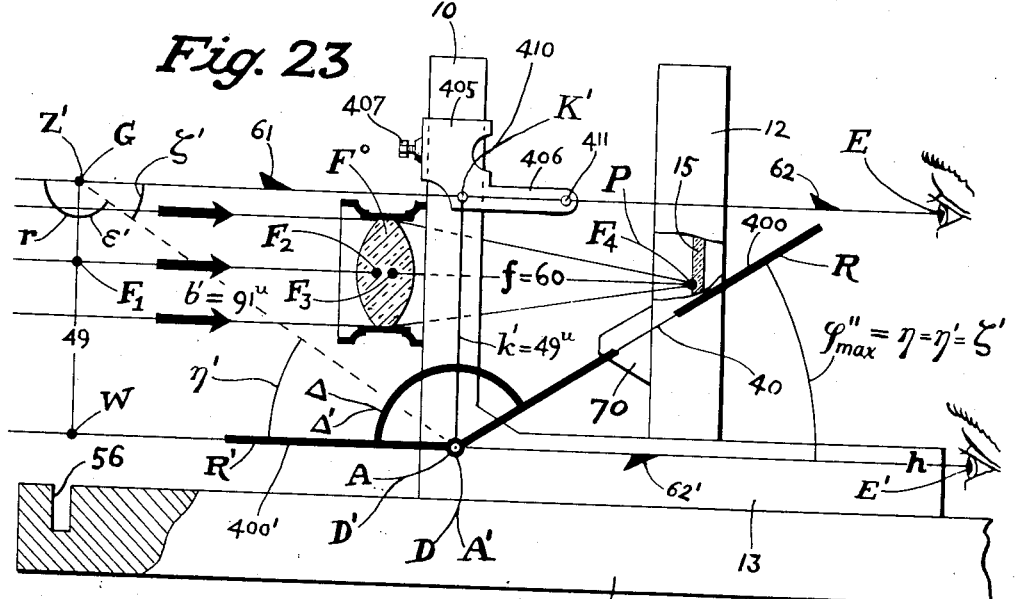

In accordance with the principles set forth in Fig. 23 of my said Case A (where the general arrangement is the same as it is here, but turned upside down), the direct horizontal sight line through the center of the eye mirror $N^t$ meets the outside focal plane $F_1$ of the lens $F^o$ in G which determines the length and inclination of the main basic inclined vector AG of the focuser, and therefore, also the basic focuser angle $r$ at G. This basic focuser angle $r$ at G is the same as the angle $r$ at G in Figs. 18 and 23 of my said Case A, and is now identified in my said later Cases Ae, At, and Au, also in my present more complete diagram Fig. 35, as the angle epsilon prime ($\epsilon'$) at $Z'$. Hence G is identified as point $G(Z')$.

All other parenthetically inclosed reference signs of the present Fig. 1, are similarly reproduced from the present Fig. 35, and, in the latter, from my said other Cases Ae, At, Au.

With the parts in focus on infinity, as shown in Fig. 1, the pivoted mirror M is parallel to the eye mirror $N^t$; and the indirect broken or reflected ray WA, $AN^t$, $N^tE^t$, or R', 61', 62', coming horizontally from infinity, traverses the outer focal plane in W, determining a rectangular triangle WAG, whose angle eta prime ($\eta'$) is evidently equal to the acute angle zeta prime ($\zeta'$), which is itself supplementary to the basic obtuse angle $r$ of the focuser.

It is evident, in Fig. 1, that $$\sin \zeta' = \sin \eta' = WG/AG \quad\quad (1)$$

also that the $$\text{basic angle } r = (180° - \zeta') \quad\quad (2)$$

Now, in the original 10-by-15 inch bristol-board drawing, Fig. 19 of my said Case A, the distance WG is 49 mm.; and the distance AG is 91 mm.; exactly as reproduced in the 10-by-15 inch bristol-board drawing of the present Fig. 1; and these two measurements are sufficient to determine: first, by equation 1 the sine of angle zeta prime ($\zeta'$); secondly, with a suitable table, angle zeta prime itself; and thirdly, with equation 2, the supplementary angle $r$, which is the basic angle of the focuser. That is to say:

$$\text{Sine of } \zeta' = 49/91 = 0.5385$$
$$\text{Angle } \zeta' = 32°\ 35' = 0.362\ Q$$
$$\text{Basic angle } r = 147°\ 25' = 1.638\ Q$$
$$(r+\zeta') = 180°\ 00' = 2.000\ Q$$

where Q stands for the quadrant or one right angle.

As terminal $J'$, in Fig. 1, occupies its extreme left-hand or zero position, its axis coincides with the stationary point H, which is identical with point H of Fig. 23 in my said Case A, also with point Z of my present Fig. 35.

The vector $A'H$, therefore, is the secondary base line of the focuser, which must satisfy two conditions, to wit: first, its inclination, eta ($\eta$), must be equal to the inclination eta prime ($\eta'$) of the oppositely inclined, and therefore anti-parallel main base line AG; secondly, its length, $A'H$, must be such that the product $AG \cdot A'H$ of these two anti-parallel focuser base lines, AG, $A'H$, shall be equal to the square of the focal length; or, in the symbols of my said Case A:

$$\text{Angle } r \text{ at } H = \text{angle } r \text{ at } G \quad \quad (3)$$
$$AG.A'H = f.f \quad \quad \quad \quad \quad \quad \quad (4)$$

whence $$A'H = \frac{f.f}{AG} \quad \quad \quad \quad \quad (5)$$

For the mounted lens F°, the focal length $f$ equals 60 units, and the vector AG equals 91, hence the anti-parallel vector $$A'H = \frac{60 \times 60}{91} = 39.56$$

as here drawn to scale, in agreement with Fig. 19 of my said Case A.

If, instead of F°, the lens to be used were lens E° having a shorter focal length $E_1 E_2$ equal to $E_3 E_4$ equal $e$ or 51 centimeters, and having its outer focal plane $E_1$ located to meet the vector AG in G', then mirror $N^t$ would have to be shifted to the lower or dotted position $N^e$, so as to lie in the horizontal through G' instead of in the horizontal through G.

Shifting the eye mirror from $N^t$ to $N^e$ shortens the vector from the value AG to the value AG', without changing its inclination or the value of the basic angle $r$ of the focuser, for $r'$ at G' is exactly equal to $r$ at G; the vector A'H, therefore remains inclined as for lens F, but in view of equation 5, it should be shorter, or only as long as indicated by A'J. The new focal length $e$ and the new vector AG', by actual measurement on the original Fig. 19 of the said Case A, are respectively equal to 51 and 79 units, and these values inserted in equation 5 yield:

$$A'J = \frac{51 \times 51}{79} = 32.92$$

also as here shown, in agreement with Fig. 19 of my said Case A, where the present dot J is called J''' and stands for the zero position H of the pintle J', properly located on the refocused frame 12, for lens E.

As the image frame 12, to be in focus, should in such case be moved to the left, through the distance $d$, Fig. 1, the terminal J' would really occupy, on frame 12, the position that is indicated by dot $j$, which is located by horizontally plotting from a distance, J to $j$, that is equal to $d$. In other words, the pin J' should be mounted on frame 12, so as to occupy position J' for lens F°, and so as to occupy the lower slightly offset position $j$ for lens E°.

The position $N^t$ or $N^e$ of the eye mirror, and the position J' or $j$ of pin J', can always and very easily be determined in this manner, provided the principal focal planes and the focal length of the lens to be used are, as here assumed, fully given and plotted; but, as a rule, the exact optical dimensions of the lens are unknown, and it is preferable to proceed by a methodical use of focusing adjustments, which should, of course, lead to the same definite results as if all fundamental dimensions of the lens to be used were known.

Any theoretically correct method of regulation should evidently place the eye mirror at $N^t$ for lens F°, and at $N^e$ for lens E°; and it should likewise place the pintle J' on frame 12, in position J' for lens F°, and in position $j$ for lens E°.

I shall fully describe two theoretically correct methods of regulation, to wit: first, the slow, tedious, tentative method which I disclosed Aug. 11, 1900, in and as part of my said case A; secondly, the far preferable, novel, quick, easy, and positive method of regulation which I was not able to describe in presentable form before the filing date of the present application. These two methods of regulation, leading by different routes to the same final result, may therefore be identified and distinguished as (1) the "tentative regulation of 1900"; and (2) the "positive regulation of 1918".

*Tentative regulation of 1900.*

The 1900 method of regulation is here reproduced substantially as given in my said Case A, page 10, line 72, to page 11, line 44; but I am now able to present it in a form that is briefer, much clearer, and also slightly improved as to substance.

The focuser should be adjusted and regulated, to secure exact correspondence of focuser and camera indications, for at least three differently distant object points, in a manner similar to that described page 5, lines 59 to 114, and Fig. 2 of my said Case A, for locating the scale Q' in Fig. 1 of said Case A.

These three differently distant object points $o'$, $o''$, $o'''$, when observed, must lie, as shown in the present Fig. 4, in the horizontal line of sight 61 that passes through the center of the eye mirror $N^x$; and they should preferably be located one, $o'$ at a great distance or infinity; the second, $o''$, very close; and the third, $o'''$, between the other two, about twice as far off as the closest, so that the ray from it to point A, will approximately bisect the angle formed by the rays $o'A$ and $o''A$, coming from the other two points.

The observer first clamps the eye mirror tentatively about where he believes it should be for the lens F° that he is using, say in a probably incorrect position $N^x$, Fig. 4, and he then proceeds with the regulation proper, which comprises three different steps, to wit: first, regulation for the distant point $o'$; second, regulation for the close point $o''$; thirdly, verification for the intermediate point $o'''$; and if verification fails, correction of position $N^x$ to a better position $N^y$ followed by repetition of the whole process.

*Step one.*—Selecting a distant object point $o'$, the observer temporarily clamps frame 12 to bed 13, in the position where he can see on screen 15, with the aid of a properly adjusted magnifier, the sharpest possible camera image of the said distant point $o'$. Then, looking into mirror $N^x$, he temporarily clamps arm 51 to frame 12, in the angular position which produces a mended focuser image of the same said distant object point $o'$, as indicated for an object point O, in Fig. 8 of my said Case A. Finally, with a scribing point, which is guided to run midway between the temporarily fixed inside walls of slot R, he marks on frame 12, a line 40, such as seen in Fig. 7.

*Step two.*—Selecting a close object point $o''$, Fig. 4, the observer repeats the three operations of "step one" on said close object point $o''$, to obtain on frame 12, a second and less inclined line 50, which intersects line 40 in a point such as V in Fig. 9.

Point V thus obtained might, in any case, be used as indicating a sufficiently correct location for the pintle J', because such location evidently secures exact two-point correspondence between the focuser and the camera, for the given point $o'$, and for the given close point $o''$. But 3-point correspondence is obtainable, and it should especially be secured because, in the present type of focuser, it simultaneously insures all-point correspondence.

Hence it is necessary to determine whether the position of V may not be improved, as explained in the following step three:

*Step three.*—Selecting an intermediate object point $o'''$, Fig. 4, the observer again repeats the three operations of "step one" on said intermediate object point $o'''$, to obtain on frame 12, a third and intermediately inclined line which will surely pass through the same point V, Fig. 9, if the tentatively selected position $N^x$ of the eye mirror really was the correct or $N^t$ position.

If this third line, not shown, misses the said point V of "step two" the eye mirror must be shifted from its first selected and therefore incorrect position $N^x$, to a second, more correct, tentative position $N^y$, and the whole process must be repeated, beginning with "step one," until the three lines marked on frame 12 intersect in one same point V, which will then be the correct position of pin J' on frame 12, not only and evidently, for the three-object point $o'$, $o''$, $o'''$ which were used in regulating and adjusting the focuser; but also, and in view of the principle embodied in Fig. 1 of my said Case A, for any other arbitrarily selected object points to any number, and without limit.

*Simpler steps one and two.*—If the distant point $o'$ be relatively close, as assumed in describing "step one" above, every correcting displacement of the eye mirror $N^x$ will yield an entirely new set of intersecting lines on frame 12.

If, however, the distant point $o'$ is virtually situated at infinity, as it would be if the distance $o'G$ were say equal to about ten thousand times the focal length of the lens used, then the correcting displacements of the eye mirror, being pure translations without rotation, will not produce any appreciable effect in the originally mended focuser image of $o'$. In such case, therefore, the first obtained line 40 really answers for all positions $N^x$, $N^y$, $N^t$, $N^e$ of the eye mirror, and such first obtained line 40 may, therefore, be used as indicating the place, Fig. 3, where the guide rail 39, should permanently be fastened to the frame 12 for the given lens $F^o$.

This not only avoids repetition of "step one" and the retracing of line 40, but it also does away with the tracing of any second line 50, Fig. 9, in observations on the close point $o''$, for point V is then found in "step two" by simply sliding pin J' along on its guide rail 39 until a mended focuser image of $o''$ has been obtained.

*Positive regulation of 1918.*

By the "tentative regulation of 1900", the adjustments were made first for the point $o'$, Fig. 4, at infinity; secondly, for the point $o''$, at close range; thirdly, and finally, for the point $o'''$ at an intermediate distance. This last, however, is in the nature of a verification rather than in the nature of an adjustment, for it simply serves to verify the correctness of the initial and tentatively made adjustment $N^x$ or $N^y$ of the eye mirror.

My present improved regulation of 1918 begins with the closest point $o''$, Fig. 4 as the first, and it makes such closest point as close as possible by placing it at G, in the outer principal focal plane $F_1$ of the lens $F^o$ to be used.

Instead, therefore, of focusing in the Fig. 4 order $o'$, $o''$, $o'''$ of 1900, by my present improved and positive method I focus in the order $o''$, $o'$, $o'''$, and the object point $o''$ must be in the outer principal focal plane of the lens used, so that the corresponding camera extension $F_4P$, as measured from the principal focus $F_4$, Fig. 9, shall be infinite.

The focuser is therefore adjusted and regulated ready for use with any one of different lenses, by means of three entirely independent and positively made focusing adjustments, hereinafter distinguished as: adjustment number one; adjustment number two; and adjustment number three.

*Adjustment number one.*—Adjustment number one, shown as completed in Fig. 6, positively determines the proper position $N^t$ of the eye mirror. It is made, as seen in Fig. 6, by focusing on right-hand infinity. That is to say, the camera is mounted on an optical bench 55 which is grooved near one end, at 56, to admit and firmly support a ground glass screen 57, whose inside or right-hand face is the ground face.

The usual ground glass 15, Fig. 1, is removed in Fig. 6, so that the rays coming from right-hand infinity, may be admitted as indicated by the three heavy arrows, through the rear frame 12 of the camera, to be brought to a sharp focus on screen 57, by sliding the camera frame 10, 13, along on bench 55, while the observer is looking from the left, with a properly adjusted magnifier, through screen 57.

The real conjugate position of frame 12, for screen 57, is, in such case, at right-hand infinity. Now, if frame 12, in the completely regulated camera of Fig. 1, could be moved all the way to infinity, it would lower arm 51, bringing it gradually, and eventually, into the horizontal or limiting position of Fig. 6. The focuser arm 51 should, therefore, occupy this exactly horizontal position of Fig. 6, whenever the camera is focused, as in said Fig. 6, on the outside principal focal plane $F_1$ of its lens $F^o$ being used.

This fixes the corresponding inclination of mirror M so that a ray T'A, reflected on mirror M, at A, would proceed along R' to meet the screen 57 in a certain object point G. This point G radiates back along the same path R', 61' and its identification is facilitated, for the observer's eye at $E^x$, by its observed coincidence with some characteristic point of a design which is marked on screen 57, where it will surely cover the probable location of G.

Now, if the observer shifts to the right, and looks horizontally into the eye mirror at $N^x$, or at $N^t$, he will see, at $A^x$, or at $A^t$, the centrally reflected image of the central sighting mark of mirror M; and he will simultaneously see, at the same level as $A^x$, or $A^t$, the centrally reflected image of the said object point G.

This centrally reflected virtual image of G, being invariably situated on the horizontal through the eye mirror $N^x$, or $N^t$, may be raised or lowered, at will, by simply raising or lowering the said eye mirror; and it may thus be brought to stand on a level with, but as seen in Fig. 6, considerably to the left of its original object point G. In such leveled position it must, for an observing eye at the same level, apparently coincide with G, indicating that the eye mirror has been set in its proper or $N^t$ position for the given lens $F^o$.

The present "adjustment number one" may, therefore, be briefly described as follows: The observer must (*a*) temporarily clamp the camera bed 13 to the bench 55, as in Fig. 6, where he can see, on screen 57, the sharpest possible image of an object point at right-hand infinity; (*b*) he then temporarily clamps arm 51 to bed 13 in the horizontal position of Fig. 6; (*c*) now, looking from the right hand side horizontally into the eye mirror, he notes that the centrally reflected object point image is that of a certain clearly identified object point G, on screen 57; (*d*) he then lowers, or raises, the eye mirror until the said centrally reflected image G has been brought into apparent coincidence with the original or mirror covered part of G; (*e*) and, finally, he clamps the eye mirror to rail 34, Fig. 1, in its thus determined proper position $N^t$, by tightening screw 37.

*Adjustment number two.*—Adjustment number two, shown as completed in Fig. 7, is substantially identical with the "simpler step one" described above, and it similarly determines the locus 40 of pin J' on frame 12. It is made by focusing on an object point situated at left-hand infinity, and it may briefly be summarized in a series of distinctly indicated operations, as follows: (*a*) replace the ground glass 15, which was temporarily removed in carrying out the first-described "adjustment number one;" (*b*) temporarily clamp frame 12 to bed 13, in focused relation on left infinity; (*c*) raise arm 51 and temporarily clamp it to frame 12, in the position where it produces a mended focuser image of the object point at left infinity; (*d*) scribe line 40; (*e*) fasten guide rail 39 to frame 12, directly over line 40 as indicated in Fig. 3; (*f*) mount pin J' on its rail 39 and in operative engagement with slot R, but leave the clamp screw 38' loose.

*Adjustment number three.*—Adjustment number three is identical with the above-described "simpler step two." It may, therefore, briefly be summarized in a few distinctly indicated operations as follows: (*a*) temporarily clamp bed 13 of the camera to the bench 55 about where shown in Fig. 9; (*b*) temporarily clamp frame 12 to bed 13 in properly focused relation on screen 57; (*c*) shift pin J' along on its guide rail 39 to mend the focuser image of the object point V' which is the same point of screen 57 that served as point G in "adjustment number one"; (*d*) and finally, tighten the clamp screw 38'.

The focuser, being what I have called in my said Case Ae a "theoretically exact focuser," is now accurately adjusted and regulated to secure all-point correspondence with the given lens F°.

*Improved Figs. 12 to 15 mount for pin J'.*

The mark 40, Figs. 3, 7 and 9, used to locate rail 39 with its two permanent fasteners 39' and 39'', is hardly more than a workshop expedient. It answers well enough for any one given lens provided no error is made in driving the permanent fasteners 39' and 39''. Where any such error was made, its correction is apt to present great difficulties, because the old set of holes, even if refilled, may interfere seriously with the proper location of any desirable new set. Moreover, the mere necessity of driving permanent fasteners exactly in certain indicated positions is, in itself, objectionable because it always requires care and skill; also because, in spite of any care and skill that may in such case be exercised, the grain of the wood will often lead and force a fastener to one side of its intended position.

A solution that is free from all such objections and that furthermore has the advantage of being simple as well as completely mechanical and efficient, is shown in Figs. 12 to 15.

Here the rail 39 of Fig. 3 is replaced by a bar 139 having a longitudinal undercut slideway or groove 140, also a longitudinal slot 141, Figs. 13 and 15, which is traversed by a clamp plate 142, whose two ends are fastened to frame 12 by two clamp screws 143 and 144.

The undercut groove 140 admits nuts such as 146, 147, Figs. 12, 13 and 15, which respectively receive bolts 146', 147', that may be fixed at any desired points of the slideway 140 by simply screwing them through their nuts until they press firmly against the bottom of groove 140, as best shown in Fig. 15.

When the two clamp screws, 143, 144 of clamp plate 142 are loosened sufficiently, bar 139 may be slid around, raised, lowered, shifted laterally or longitudinally, and generally moved so that it may be brought into any arbitrarily desired position with relation to frame 12; and it may then be firmly fixed in such desired relative position, by retightening the said two clamp screws 143, 144.

The desired relative position of bar 139 to frame 12 is determined in the course of the above described "adjustment number two", in substantially the same manner as illustrated in Fig. 7, for determining the position of line 40, which is no longer needed.

The whole operation is rendered positive, and quasi-automatic, by temporarily connecting bar 139, as shown in Fig. 14, with the radial arm 51, by means of the said two bolts 146', 147', and then proceeding as follows:

Having loosened the two screws 143, 144, and having temporarily clamped frame 12 to bed 13 in focus on left infinity, as in Fig. 7, the observer raises arm 51, together with its bar 139, until he has obtained a mended focuser image of the same object point at left infinity; and the bar 139, is then firmly clamped to frame 12 in its thus self-determined proper position on frame 12, by tightening the two clamp screws 143, 144. Its exact distance from D is immaterial.

One of the said two bolts 146', 147' must now be removed, and the remaining one, say 146' is kept to serve in place of the pin J' of Figs. 1 and 3.

This bolt 146' is therefore properly located on its bar 139 by means of the same "adjustment number three" which was described above for locating pin J' on the guide bar 39. Once located, say as shown in the intermediate or dotted position of Fig. 14, it is firmly fixed in place by tightly screwing it through its nut 146 against the bottom of the undercut groove 140. A drop of solder may be used to insure it against any subsequent loosening or displacement on its bar 139.

If the camera frame 12 is metallic or metal-covered; the bar 139 may easily and likewise be insured against accidental loosening or displacement by the use of properly distributed drops of solder.

*Angle delta ($\Delta$) in Fig. 1.*

My said Case A (in Fig. 17, page 9, lines 33 to 40; in Fig. 18, page 9, lines 68 to 76; and particularly in the equation annexed to and forming part of its Fig. 23) lays stress on the present angle $r$ at G as being the important angle of the focuser, and I have, therefore, so far called it the "basic angle."

On the other hand, my later radial cam Cases Y, Ae, At, Au, lay stress on a certain other angle delta ($\Delta$) as being the "basic angle" of the focuser.

As a matter of fact, any given focuser of the radial cam type, either optical or wholly mechanical, contains more or less concealed in its structural embodiment (1) an angle that is identical with the said angle $r$ at G of my said Case A; and (2) another angle that is identical with the said basic angle delta ($\Delta$).

It is, therefore, desirable to show where this angle delta ($\Delta$) occurs in the optical focuser of Fig. 1.

Referring to Figs. 6 and 7, it is plain that the radial slot R in arm 51, and the incident ray R', determine an obtuse angle which may be indicated by an imaginary arc delta (Δ), whose center, omitted for clearness, is variable in position, but whose angular value is constant and always equal to the basic angle *r* at G.

In Fig. 6 this angle delta (Δ) is evidently equal to the basic angle *r* at G, because the oblique line R' first meets a horizontal through G, to form the angle *r*; and then, at its lower end produced, it meets the produced horizontal axis of slot R, to form the angle delta (Δ).

That the angle delta (Δ), equal to *r* at G in Fig. 6, must in any other position of arm 51, remain invariably equal to *r* at G, is dependent upon the fact that arm 51 and the incident ray R', are bound to rotate in the same direction and at the same rate. This may be proved as follows:

If the mirror M is turned counter-clockwise from its Fig. 6 position, through any given angle of *a* degrees, it is evident that the incidental ray R' will likewise be rotated counter-clockwise, but through an angle of twice *a* degrees. It is, furthermore, evident that this same counter-clockwise rotation of *a* degrees in mirror M, must be produced by a counter-clockwise rotation of twice *a* degrees imparted to arm 51. That is to say, any angular displacement of $2a$ degrees imparted to arm 51 and its slot R, is likewise and simultaneously imparted to the incidental ray R'.

The relative inclination of the incidental ray R', to the radial slot R, is therefore invariably equal to the basic angle *r* at G, not only when arm 51 is horizontal as in Fig. 6, but also when it has been turned up into any other position.

Thus, in Fig. 7, where the radial slot R of Fig. 6 has been turned up or counter-clockwise through the angle eta ($\eta$), the mirror M has been turned counter-clockwise through one-half of angle eta ($\eta$), and the incident ray R' has been turned down or counter-clockwise from its Fig. 6 position through twice one-half eta, or through eta, here represented by the equal angle eta prime ($\eta'$). The relative inclination delta (Δ), of R' to R, in Fig. 7, is therefore exactly the same as it was in Fig. 6.

Now, let the inclination of mirror M with reference to mirror N$^f$ in Fig. 6 be represented by mu ($\mu$), so that said mirror M must be rotated counter-clockwise, through an angle equal to angle mu ($\mu$), in order to assume the parallel or zero-inclined position of Fig. 7.

It is then obvious that angle mu ($\mu$) must be equal to one-half angle eta ($\eta$), or more clearly, that $$2\mu = \eta \qquad (3)$$

But angle eta ($\eta$) of Fig. 7, is evidently the angular supplement of angle delta (Δ), so that, in view of equation 3, the value of angle delta must be equal to two right angles minus twice angle mu; or in symbols, using Q as before, for the quadrant or one right angle, $$\Delta = 2Q - 2\mu$$

whence $$\Delta = 2(Q - \mu) \qquad (4)$$

That is to say, the relative inclination mu ($\mu$) of the mirrors in Fig. 6, determined automatically while making "adjustment number one," predetermines the basic angle delta (Δ) of the focuser.

This important principle establishes the theoretical identity that exists between the optical radial cam focusers of my said Case A, and the mechanical radial cam focusers of my said Case Au.

*The Figs. 16 to 21 camera.*

As the incidental ray R' of Figs. 6, 7, and 9 does rotate in constant angular relation delta (Δ) with the radial slot R, the mirror M of these figures may be replaced, as in Figs. 16, 17, and 19, by a plain alidade or sighting arm 300' which is pivoted at A, and which is mechanically connected to the radial arm 300, or R, by means of a rigid arc delta prime (Δ') which acts through links 301, 302, of such lengths as to form a parallelogrammatic linkage AA'B'B.

The mechanical principle here involved is the same as in Fig. 8 of my said Case U, where the basic angles, corresponding to my present obtuse basic angles *r* and delta, are both equal to one right angle.

As there is no mirror at A the observer, after sighting horizontally from E, shifts his eye to E', in alinement with D'R', as in Fig. 1 of my said Case A. The mirror retained at N$^t$ simply serves as a peep sight which coöperates with the image A$^t$ of A as a bead sight.

The regulation of the Fig. 16 camera is identically the same in principle as that of the Fig. 1 camera, and the three different phases of such regulation may, therefore, be illustrated as in Figs. 16, 17, and 19, corresponding respectively with Figs. 6, 7 and 9.

*The Figs. 22 to 27 camera.*

The camera of Fig. 16 may be called a "two-sight focuser" to distinguish it from the "double-sight focuser" of Fig. 1, as well as from the "single-sight focuser" of my said Case At.

An extremely simple form of "two-sight focuser," Fig. 22, is easily derived from that of Fig. 16, by translating the right-hand radial cam gear of said Fig. 16, through the distance A'A, so that the equal links AA', BB', vanish; but the pin V, Fig. 25, must, in this case, be supported on a special bracket-like extension 70 of frame 12.

The sector angle delta prime ($\Delta'$) here becomes identical with delta ($\Delta$), being determined by an arcuate bar delta prime ($\Delta'$), which rigidly connects the radial arm 400 or R with the radial arm 400' or R'.

In place of the adjustable eye mirror N$^t$ of Fig. 16, this Fig. 22 camera, carries a vertically adjustable bracket 405, 406, whose base 405 may be fixed to frame 10 at any desired elevation by tightening the clamp screw 407; and whose horizontal arm 406, carries two horizontally disposed sights 410, 411.

The fore sight 410 is located directly over the point D' so that it shall be identical with point K' of the effective base line D'K' of the focuser considered as a range finder.

The regulation of this Fig. 16 camera is identically the same as that of the Fig. 1 camera, and the three different phases of such regulation may, therefore, be illustrated in Figs. 22, 23, 25, corresponding respectively with Figs. 6, 7 and 9.

The principal advantage of this Fig. 22 form is demonstrative, because it so clearly brings out (1) the basic triangle K'D'Z'; and (2) the constant angular relation delta ($\Delta$) of what will presently appear to be the two radial cams R and R'.

That the first or optical radial cam focuser of my 1900 case, Case A, is virtually founded on the same principles as my more recent wholly mechanical forms, is fully confirmed by considering the semi-diagrammatic combinations of Figs. 28 to 36, where I moreover indicate how the symbols of my said Case A correspond to those of the uniform system of symbols which I have adopted in my said later radial cam Cases Ae, At and Au.

*Direct acting mechanical focuser (Figs. 28 to 33).*

The most easily understood radial cam focuser of the non-rectangular type is the direct-acting focuser of Fig. 28, which corresponds to the rectangular type of direct acting focuser seen in Fig. 8 of my said Case U. The lens 500 is stationary and the focuser acts directly on terminals V and V', which are, respectively, fixed in the two movable end planes P and P' that are to be kept in conjugate or focused relation.

Fig. 28 is partly diagrammatic for clearness, but all of its fundamental dimensions, as given in the tabular Fig. 30, are exactly drawn to the scale shown in Fig. 29.

The lens 500 is mounted in a partition 501, which is fixed by a screw, such as 502, to the bed 503 and to the two similar side walls, only one of which, wall 504, appears in the figure. The bed 503, the side wall 504, and the nearer omitted side wall, form a guideway for slide blocks 505, 505', which, respectively, carry the two focusing screen or image planes 506, 506'.

The lens 500 is fully determined, for all present purposes, by plotting its two principal foci F, F', and its two nodal points N, N'. In the case illustrated its focal length F, represented by FN, also by N'F', equals 30 centimeters; and its internodal distance NN', purposely chosen large for clearness, is equal to plus 5 centimeters.

Whenever screens 506 and 506' are in focus on each other, the distance PF or $p$ of plane P from the principal focus F, and the distance F'P' or $p'$ of plane P' from the principal focus F', form a product PF.F'P' or $p.p'$ which is invariable, and which is equal to the square of the focal length of the lens used. That is to say, points P and P' are really conjugate foci of the lens, or in focus on each other, whenever the distances PF, F'P' satisfy Newton's formula, to wit:

$$PF.F'P'=f^2 \qquad (90)$$

or more simply $$p.p'=f^2 \qquad (5)$$

which is equation 1 of my said Case A and equation 4 of my said Cases K and O. It recurs in all of my said other cases, excepting Case B, where it is, however, implied by references to Case A.

Points P and P', being movable, are shown as perforated or wheel dots to indicate motion. Stationary points, such as F, N, N', F', are shown as unperforated or solid black dots, to indicate fixedness.

To design this direct form of focuser proceed as follows:

In the left-hand vertical planes P and F select any two equally high or opposed points V, Z, to constitute the fixed terminal Z, and the movable terminal V, of the left Newtonian space VZ or $v$ of the focuser. In all relative positions of the two vertical planes P and F it is evident that the two distances PF and VZ will always be equal to each other, as noted in the equation $$P=PF=VZ=v$$

or more simply $$p=v \qquad (6)$$

where PF or $p$, and its equivalent VZ or $v$, may have any common value, ranging from zero to infinity.

In the right-hand vertical planes F' and

P′, similarly select any two equally high or opposed points Z′ and V′, to constitute the fixed terminal Z′, and the movable terminal V′, of the right-hand Newtonian space Z′V′ or $v'$ of the focuser; so that, in all relative positions of the said two planes F′ and P′, the distance F′P′ or $p'$, and the distance Z′V′ or $v'$, will always be equal to each other, as noted in the equation $$p' = F'P' = Z'V' = v'$$

or more simply $$p' = v' \quad \text{---------------} \quad (7)$$

where F′P′ or $p'$, and its equivalent Z′V′ or $v'$, may have any common value, ranging from zero to infinity.

Multiplying equation 6, term for term, by equation 7, yields $$p \cdot p' = v \cdot v' \quad \text{-------------} \quad (8)$$

which is evidently true for any one pair of values arbitrarily assigned to $p$ and $p'$; hence it is true, even when the end planes P and P′ are not in focus on each other.

To be in focus on each other, points P and P′ must be so situated that the distances $p$ and $p'$ of equation 8 shall satisfy Newton's formula or equation 5, above. Therefore $$v \cdot v' = f^2 \quad \text{-------------} \quad (9)$$

which is true whenever the end planes P and P′ are in focus on each other; and which should, therefore, likewise be true for all positions of the focusing mechanism or focuser. That is to say, if the focuser, considered as a pure mechanism, satisfies equation 9, it will act in strict correspondence with the lens, which may henceforth be left out of consideration.

At Z and Z′, therefore, plot any two anti-parallel or equally but oppositely inclined vectors ZD, Z′D′ which may be of any preferable lengths satisfying the equation:

$$ZD \cdot Z'D' = f^2$$

or more simply $$b \cdot b' = f^2 \quad \text{-------------} \quad (10)$$

These two vectors ZD, Z′D′ constitute the two fundamental or anti-parallel base lines $b$, $b'$ of the focuser. Base $b$ is 20 cm. long and base $b'$ is 45 cm. long, so that the product $20 \times 45$ equals $30 \times 30$ or 900 as required by equation 10.

The two rectangular components ZK and KD of vector ZD or of base line $b$, and the two rectangular components Z′K′ and K′D′ of vector Z′D′ or of base line $b'$, determine two similar rigid rectangular triangles KZD and K′Z′D′, which are shaded to indicate that the triangle KZD serves as an imaginary fulcrum for the lever R, in the left end of the focuser; while triangle K′Z′D′ serves as an imaginary fulcrum for lever R′, in the right-hand end of the focuser. The heights KD, K′D′ are the two effective base lines of the focuser; but these heights do not enter into the present computation which is exclusively based on the said two anti-parallel hypotenuse elements $b$, $b'$.

The anti-parallel relation of these vectors $b$, $b'$ is preferably defined by the equality of angles epsilon ($\varepsilon$) and epsilon prime ($\varepsilon'$); because either one of these two equal angles is a representation of the "basic angle" delta ($\Delta$) of the focuser; and the exact meaning of "anti-parallel," in the present connection, is made clear by plotting K′Z″ equal to K′Z′ so as to form an isosceles triangle Z′D′Z″ whose sides D′Z′ is parallel to DZ and anti-parallel to D′Z′. The angle epsilon second ($\varepsilon''$) at Z″ is, of course equal to the basic angle epsilon prime ($\varepsilon'$) at Z′.

The lever R, pivoted on the imaginary "fulcrum" KDZ, at D, and sliding through V, constitutes the left radial cam. It occupies its highest, or horizontal position, Fig. 31, when the pintle V is assumed to be at left infinity; and it occupies its lowest, or zero position DZ, Fig. 32, when resting flat against its fulcrum ZDK, with pintle V in its zero position Z, making the space VZ or $v$ equal to zero.

The second lever R′, pivoted on the imaginary "fulcrum" K′D′Z′, at D′, and sliding through V′, constitutes the right-hand radial cam. It occupies its highest or horizontal position, Fig. 32, when the pintle V′ is assumed to be at right hand infinity; and it occupies its lowest or zero position D′Z′, Fig. 31, when resting flat against its fulcrum Z′D′K′, with pintle V′ in its zero position Z′, making the space Z′V′ or V′ equal to zero.

The radial cam R′ is provided with a short auxiliary radial arm 508. The arm 508 is rigidly connected with R′ by means of a rigid arc delta prime ($\Delta'$) of such length that the angle R′D′B′ or delta prime ($\Delta'$) shall be exactly equal to the basic angle epsilon prime ($\varepsilon'$) at Z′.

The other radial cam R carries a pivot pin B, whose distance BD from D equals the length B′D′ of arm 508. This pivot pin B is connected to the end B′ of arm 508 by a link 509, whose length BB′ is made equal to the interpivotal distance DD′. The articulated parallellogrammatic connection DBB′D′, thus formed, evidently keeps arms DB and D′B′ parallel to each other, so that the two radial cams DR, D′R′, produced rearwardly if necessary, will always meet as in point C at an angle delta ($\Delta$) which is constantly equal to the structural angle delta prime (Δ') and which really constitutes the most characteristic representation of the basic angle.

The basic angle, in the present form of focuser, therefore, recurs at five different places, as noted in the following line of equations:

$$\Delta = \Delta' = \varepsilon = \varepsilon' = \varepsilon'' \quad \quad \quad (11)$$

which holds as a result of design and mechanical connections, and which insures that the two triangles ZVD and Z'D'V', though variable in shape, shall, in any given position of the focuser, be similar.

This similarity is more easily proved after the focuser has been seen in its two extreme positions, to wit, first, the extreme position of Fig. 31, where the spaces $v$ and $v'$ are, respectively equal to infinity and zero; and, secondly, the extreme position of Fig. 32, where these same spaces $v$ and $v'$ are, respectively, equal to zero and infinity.

In Fig. 31, with Z'V' or $v'$ equal to zero, the radial cam R' coincides with D'Z' and the arm 508 must be horizontal, because the angle delta prime (Δ') has one side D'V' in common with the "alternate" equal angle epsilon prime (ε'), whose other side is the horizontal through Z'. Arm DB, being kept parallel to arm D'B' by the link 509, must likewise be horizontal; but it could never assume such position as a mechanical element, because its terminal V would in such case be situated at left infinity. It, therefore, simply points to V assumed at left infinity. This is in exact accordance with equations 5 and 9; for, when $p'$ and $v'$ are *nil,* as in Fig. 31, the distance $p$ or $v$ must be $f^2/0$ or infinite.

Now consider the other extreme position illustrated in Fig. 32, and obtained by lowering the left radial cam DR into its zero position DZ. Arm D'B', being parallel to the arm DB, will coincide with D'Z''; and arm D'R' must be horizontal, for its angle delta (Δ) has one side D'Z'' in common with the equal angle epsilon second (ε'') whose other side is the horizontal through Z''. Arm D'R', being horizontal, points to V' assumed at right hand infinity; and this, again, is evidently in accordance with equations 5 and 9, for the distance $p'$ or $v'$ must now be $f^2/0$ or infinite.

In all intermediate positions of the focuser the two distances VZ or $v$ and Z'V' or $v'$ are finite, as in Fig. 28.

The position of Fig. 28 may evidently be derived from the extreme position of Fig. 32 by imparting equal clockwise rotations omega second (ω'') and omega (ω) to the radial arms D'R' and DR of said Fig. 32; and it may, evidently and likewise, be derived from the extreme position of Fig. 31 by imparting equal but counter clockwise rotations phi second (φ'') and phi prime (φ') to the radial cams DR and D'R' of said Fig. 31.

In any given position, Fig. 28, of the focuser mechanism, therefore, $$\omega = \omega'' \quad \quad \quad (12)$$
$$\varphi' = \varphi'' \quad \quad \quad (13)$$

But phi second (φ'') is always necessarily equal to phi (φ), and omega second (ω'') is always necessarily equal to omega prime (ω'). Hence in symbols $$\omega' = \omega'' \quad \quad \quad (14)$$
$$\varphi = \varphi'' \quad \quad \quad (15)$$

Subtracting equations 14 and 15 respectively, and term for term, from equations 12 and 13, yields $$\omega - \omega' = \omega'' - \omega'' = 0$$
$$\varphi' - \varphi = \varphi'' - \varphi'' = 0$$

whence $$\omega = \omega' \quad \quad \quad (16)$$
$$\varphi' = \varphi \quad \quad \quad (17)$$

that is to say, the two variable angles phi (φ) and omega (ω) of the left triangle ZVD are, and always remain, respectively equal to the two variable angles phi prime (φ') and omega prime (ω') of the right-hand triangle Z'D'V'.

These two triangles ZVD and Z'D'V', therefore though variable in shape, are at all times equiangular, hence similar. In any given position of the focusing mechanism the six involved and differently named angles satisfy the three following equations:

$$\varepsilon \text{ at } Z = \varepsilon' \text{ at } Z' \quad \quad (18)$$
$$\varphi \text{ at } V = \varphi' \text{ at } D' \quad \quad (19)$$
$$\omega \text{ at } D = \omega' \text{ at } V' \quad \quad (20)$$

The angles of equation 18 are constant; those of equations 19 and 20 are variable.

Structurally and functionally, terminals Z', D', V' correspond to the similarly lettered terminals Z, D, V; but it should be noted that equal and corresponding angles, in these three equations, are those having similar Greek letters. The Roman letters, excepting Z and Z', do not correspond geometrically and might, therefore, make a false impression. To identify homologous sides and angles by the use of their Roman reference signs, both triangles should invariably be read off in clockwise order at ZVD and Z'D'V', beginning with Z and Z', so as to transpose the last two or non-corresponding Roman letters.

The two triangles ZVD and Z'D'V', therefore, being similar and having their homologous sides proportional must yield $$\frac{VZ}{ZD} = \frac{Z'D'}{Z'V'}$$

or, more simply, $$\frac{v}{b} = \frac{b'}{v'}$$

whence, and in view of equation 10, above, $$v.v' = b.b' = f^2 \quad \text{---------} \quad (21)$$

where $v$ and $v'$ are variables, while $b$, $b'$ and $f$ are structural constants.

That is to say, the focuser does mechanically determine, in every one of its different conceivable positions, conjugate space elements $v$ and $v'$ which form a product $v.v'$ that is constantly equal to the second power of the focal length of the lens as required by Newton's formula, or equation 5 above.

*Partly offset mechanical focuser (Fig. 34).*

Fig. 34 shows the same combination as Fig. 28 with the four focal planes P, F, F′, P′ relatively spaced as in Fig. 28, but having the left radial cam gear combination VZKD translated or offset as a whole to the right, through a distance indicated by the equal bars $m$, $x$, which must in such case be inserted to connect the vertical planes V and Z respectively with the vertical planes P and F. This translation or offset may occur in any desired direction and to any desired extent; but, in the case illustrated, it is $m$ equals $x$ equals 9 centimeters, in the horizontal direction, with no vertical component.

Link 509 must, of course, be shortened or else replaced by a new link 609 whose length BB′ shall be equal to the new value of the interpivotal distance DD′.

The imaginary lines PV and FZ in Fig. 34 are no longer vertical, as in Fig. 28, but they are still equal and parallel to each other, so that the horizontal space VZ or $v$ remains equal to the horizontal space PF or $p$, as required by equation 6, which is, furthermore, satisfied in all other positions of PV because PV, being a fixed line of slide block 505 will move along with such block so as to always remain parallel to the zero position of PV represented by the stationary line FZ.

*Fig. 34 as "single-sight" focuser.*

To convert the "wholly mechanical" focuser of Fig. 34 into a "single-sight" optical focuser of the type disclosed in my said Case At, cut off and remove the lower blacked end of the radial cam D′R′; but, keep the pivot V′ or some equivalent material point, in plane P′, to serve as object point to be aimed at.

Focusing is then accomplished by shifting one or both of the end planes P, P′ until the eye placed at E′, and aiming along the upper retained and unblacked part of the radial arm D′R′, sees such unblacked part pointing directly at the said terminal or mark V′.

Whenever the camera is out of focus, the object point V′ is to one side of the direction D′R′; and, with such direction D′R′, it then determines an angle V′D′R′ of finite value.

The operation of focusing with a "single-sight" focuser, therefore, consists in imparting any displacement that will reduce the said finite angle V′D′R′ to zero value; for, whenever the value of angle V′D′R′ is equal to zero, the ray of light V′D′ is coincident and virtually identical with the original radial arm D′R′ of the automatically and, therefore, ever-focused "mechanical" focuser.

*Fig. 34 as "two-sight" focuser.*

To convert the "wholly mechanical" focuser of Fig. 34 into a "two-sight" optical focuser, two separate sighting means must be provided, to wit: first, one for sighting horizontally through Z′ toward V′; and, secondly, one for sighting obliquely through D′ and along D′R′ toward V′.

The first, or horizontal sighting means, may consist in any two fixed sighting points, such as K″ and K′; the second may consist in the upper unblacked part of arm D′R′ in Fig. 34, as such arm D′R′ is left after removal of its lower blacked part.

By sighting horizontally from E, along K″K′, the observer first discovers, and then mentally identifies, that point of the object which corresponds to the terminal pivot V′ of the mechanical focuser. And then, shifting his eye to E′, he sights obliquely through D′ along the upper unblacked and retained part of the radial arm D′R′. If such sighting line E′D′R′ meets the said mentally identified point V′, the camera is in focus; but, if the oblique sighting line E′D′R′ misses the said mentally identified object point V′, the camera is out of focus, and it may evidently be focused by any relative displacement of parts that reduces the angle V′D′R′ to zero value. The focus thus secured will be identically the same as if the mechanical connection had not been severed.

As long as the said mentally identified object point V′ remains guided by bed 503 it may be marked as an invariable point V′ of the object plane P′, and the focuser may henceforth be used exclusively as a "single-sight" focuser; but, when the object to be photographed is any other object, set in place of plane P′V′, or whenever it is such plane P′V′ itself, removed so far to the right as to be unsupported by the camera bed 503, then point V′ ceases to be a predetermined fixed point of the object plane, and the focuser must necessarily be used as a "two-sight" focuser.

Two-sight optical focuser of Fig. 35.

The camera of Fig. 34, with its mechanical focuser converted, as just explained, into a "two sight focuser," and then simply inverted, becomes the two-sight optical focuser of Fig. 35, which contains all the elements of Fig. 9 relatively arranged exactly as they are in said Fig. 9.

Figure 24:
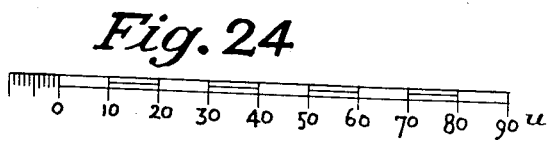

This diagram Fig. 35 might be made more general by introducing, in Fig. 34, other translations and rotations, such as in Figs. 23 and 24 of my said case Ae, but it is sufficiently general for all present purposes, and what is lacking in this respect will be found in my said other Cases Ae, At, and Au.

Double-ender optical focuser.

In Fig. 34, the left-hand mechanical gear VDKZ might evidently be converted into an optical range finder, in the same manner as was done with the right hand combination V'D'K'Z', and in such case the focuser as a whole would consist of two mechancally connected optical range finders.

The left-hand range finder RDKZ, sighting obliquely along DR, and horizontally along KZ, would have an effective base line DK; whereas the right-hand range finder R'D'K'Z', sighting obliquely along D'R', and horizontally along K'Z', would have an effective base line D'K'.

The dimensions in these two optical range finders are generally different, as shown in Fig. 34; but every structural or only theoretical element, in the left-hand range finder, has its corresponding structural or only theoretical element in the right-hand range finder.

This balanced nature of the radial cam focuser was quite evident in the mechanical radial cam focusers of my said Cases U, Y and Au; but the fact that the optical focuser of my said Case A is capable of the same balanced treatment, did not reveal itself until after I had made a thorough study of the adjustments.

The co-basic angle gamma.

The invariable acute angle designated by gamma ($\gamma$), in Fig. 25, is identical with the angle gamma ($\gamma$) of Fig. 16 in my said Case Ae; and it is even structurally represented in Fig. 19 of the same said Case Ae. This angle gamma ($\gamma$) being supplementary to the basic angle delta ($\Delta$) is of the same importance as the said basic angle ($\Delta$), and it may therefore be called the "jointly basic" or more briefly "co-basic" angle of the focuser. According to the Merriam Webster of 1910, the prefix "co-" signifies in general: with, togther, in conjunction, jointly.

In the present Fig. 28, this co-basic angle gamma ($\gamma$) recurs at seven different places, as indicated by the following line of equations:

$$\gamma = \gamma' = \eta = \eta' = \zeta = \zeta' = \zeta'' \quad \text{(22)}$$

similar to the line of equations identified above as equation 11.

In view of equation 3 above, and the just considered equation 22, it is plain that this same "co-basic" angle gamma ($\gamma$) is equal to twice the angle mu ($\mu$) which mirror M makes with mirror $N^t$ or $N^x$, in Fig. 6, when the radial arm 51 or R is held in its horizontal or D$h$ position.

This same co-basic angle gamma ($\gamma$) furthermore represents the highest attainable values of the co-varying angles phi second ($\varphi''$) and omega second ($\omega''$), which measure the respective inclinations of the two radial arms R and R', and it is always equal to their sum; that is to say $$\varphi'' + \omega'' = \gamma \quad \text{(23)}$$

Phi second ($\varphi''$) has its maximum or gamma value in Fig. 32; also in Figs. 1, 7, 14, 17, and 23. Omega second ($\omega''$) has its maximum or gamma value in Fig. 31; also in Figs 6, 16, and 22 where it is temporarily identical with the invariable angle WAG of Fig. 6.

As fully demonstrated in my said Case Ae, showing optical focusers, whose basic angle delta ($\Delta$) is acute, all really practical forms of the optical focuser of the radial cam type must have a basic angle delta ($\Delta$) that is obtuse; and they must, therefore, have a co-basic angle gamma ($\gamma$) that is acute; that is to say, the cosine of their co-basic angle gamma ($\gamma$) is always positive, while the corresponding and numerically equal cosine of their basic angle delta ($\Delta$) is always negative.

General remarks on "adjustment number one."

NOTE 1.—If the eye mirror is considered as temporarily fixed in its incorrect position $N^x$ of Fig. 6, there may be distinguished three different characteristic straight lines, to wit: (1) the horizontal sight line through $N^x$; (2) the vertical focal line through $F_1$; and (3) the oblique ray line R' which is directed on A to produce a mended focuser image of point U. These three characteristic lines generally meet in three different points G, U, and Q, and the sole object of any suitable "adjustment number one" is to bring these three different points G, U, and Q, into coincidence so they shall constitute the single characteristic point Z' of the focuser.

NOTE 2.—Any adjustment, either single or compound, that is capable of bringing these three points G, U and Q of Fig. 6 into coincidence as one point Z', may be used in Fig. 6 as a suitable "adjustment number one".

NOTE 3.—I have so far disclosed three different "adjustments number one", which may be distinguished as (1) the "horizontal adjustment number one" of my said Case Ae; (2) the "angular adjustment number one" of my said Case At; and (3) the virtually "vertical adjustment number one" in Fig. 6, or Fig. 16, or still more clearly in Fig. 22 of my present Case Bc.

NOTE 4.—Assuming these three different adjustments to be applied as corrective adjustments in the present Fig. 6, they may very definitely be distinguished by their effects as follows: (1) the "horizontal adjustment" of my said Case Ae would correct by imparting to the ray D'R' a "horizontal" displacement to the right, equal and parallel to the line UQ, making point Q the Z' point of the focuser; (2) the "angular" adjustment of my said Case At would correct by imparting to the ray D'R' a clockwise "angular" displacement equal to the angle GAQ, making point Q and Z' point of the focuser; and (3) the virtually "vertical" adjustment of my present Case Bc corrects by imparting to the horizontal sight line $N^xA^x$, a vertical downward displacement equal to the line QG, making point G the Z' point of the focuser.

NOTE 5.—Lowering the eye mirror, as from $N^x$ to $N^t$, virtually shortens the effective range finding base line D'K' of the focuser considered as a range finder; and it would, therefore, be preferable to build the camera with the eye mirror permanently fixed at $N^x$, or even closer to the top of the lens frame 10, so as to make and keep the effective base line D'K' as large as possible. In such case, however, the above described "adjustment number one" must be replaced by a form of adjustment which leaves the said effective base line D'K' invariable; as, for instance, by the "horizontal adjustment number one" of Fig. 12 in my said Case Ae; or else by the "angular adjustment number one" Fig. 5 of my said Case At.

NOTE 6.—Substantially the same adjusting effect as in the "adjustment number one" of my said Case Ae might be produced in said Case Ae, as well as in the present Case Bc, by (1) leaving the focuser in fixed relation to the lens frame, here frame 10 of Fig. 6; and (2) displacing the camera lens F° horizontally in said frame 10, so as to horizontally shift $F_1$, and the vertical through $F_1$ until the two points G and Q have been brought into coincidence with U, making U the Z' point of the focuser.

NOTE 7.—To carry out the special modified Case Ae, "adjustment number one" of my Note 6, with the aid of screen 57, proceeds as follows: (1) Temporarily clamp arm 51 to bed 13 in position of Fig. 6, with slot R parallel to bed 13; (2) looking from the right, horizontally along $N^xA^x$, draw the camera as a whole back on bench 55 to mend the image of point U as seen on screen 57, and temporarily clamp bed 13 to bench 55 in its thus ascertained image mending position; (3) looking now from the left, through screen 57, displace the lens F° horizontally in its lens frame 10 to focus on right hand infinity, bringing point $F_1$ into plane 57, and the two points G and Q into coincidence with U, thus making point U the Z' point of the focuser.

NOTE 8.—The effective base line D'K', or AG.sin $r$, of the focuser considered as a range finder, corresponds to $h$ or G°A°.sin QG°A° in Fig. 17 of my said Case B, where it is non-adjustable in length.

NOTE 9.—As the correct position of the eye mirror, in Fig. 1, is $N^e$ for lens E° and $N^f$ for lens F°, making the effective base line D'K' shorter for lens E° than it is for lens F°, the focuser of Fig. 1 may be considered as an optical range finder whose base line is made variable in length to suit the particular lens used.

*Remarks on variations in the basic angle delta.*

NOTE 10.—The product $f.\sin \Delta$, or its equivalent $f.\sin \gamma$, stands for a length shorter than $f$, that does not appear in any of my diagrams, but that is nevertheless remarkable because it is the geometrical mean between the two effective base lines DK, D'K' of the focuser. That is to say $$\frac{D'K'}{f.\sin \Delta} = \frac{f.\sin \Delta}{DK} \quad \text{(24)}$$

which is derived by observing that, in Fig. 35, DK or $k$ equals $b.\sin \Delta$, while D'K' or $k'$ equals $b'.\sin \Delta$; so that the product $k.k'$ equals $b.b'.\sin^2 \Delta$ or $f^2.\sin^2 \Delta$. Using the simpler symbols, $k$ for DK, and $k'$ for D'K', equation 24 yields an important formula, to wit:

$$\sin \Delta = \sqrt{k.k'}/f \quad \text{(25)}$$

NOTE 11.—In view of equation 25, it is plain that the two effective base lines $k$ and $k'$ might both be made invariable in length in the same structure, for use with any one of different lenses, provided the basic angle delta ($\Delta$) is made adjustable, as explained below in Note 12 or in Note 13, so that its value may be set to satisfy equation 25. In such case, however, the lens should be horizontally adjustable in the lens frame 10, and the pintle V should be horizontally adjustable on the image frame 12.

Note 12.—The basic angle delta (Δ) may be made adjustable in the two-sight type of focuser, either Fig. 16 or Fig. 22, by simply providing means for either lengthening or shortening, at will, the arc delta prime (Δ'), say as in Fig. 5 of my said Case At, so that arm R' may be set at any desired inclination eta prime (η'), while arm R is held temporarily clamped in the horizontal position of said Fig. 16, or of said Fig. 22.

Note 13.—The basic angle delta (Δ) may be made adjustable in the mirror form or "double-sight" type of radial focuser, present Fig. 6, by changing the value of the angle mu (μ) which, in view of equation 4, equals the complement of one-half of the said basic angle delta (Δ). That is to say, the mirror M in Fig. 6 must be angularly adjustable about pivot A and with reference to arm 49, while the radial cam R is held temporarily clamped in the horizontal position of said Fig. 6. The structural details of such adjustment may be the same as those shown in Fig. 1 of my said Case Ax, for the angular adjustment of a mirror R on base 20, which would correspond to the present arm 49, if the said base 20 were itself pivoted to turn on axis 31.

Note 14.—The "general 3-point adjustment" which is described as applied to focusers that are "wholly mechanical," on pages 7 and 8, and in Fig. 7 of my said Case Au, now Patent 1,280,368, is evidently applicable to the different adjustable "optical" focusers of the present Case Bc. That is to say, first, the zero or relative position that bed 13 and bench 55 must occupy in Figs. 6, 16, or 22, for a test object at right hand infinity; and, secondly, the zero or relative position that frame 12 and bed 13 must occupy in Figs. 7, 17, or 23, for an object point at left hand infinity; may both be determined, without really focusing on infinity, by means of equations corresponding to equations 9 and 10 of my said Case Au, and based on a 6-point, or 3-conjugate-pair, set of finitely separated object and image plane positions, which are identified, in the said Case Au, by 3 lens-frame points G, H, K, for the object, and by 3 respectively conjugate lens-frame points G', H', K', for the image. The focuser is in such case regulated for an "ideal" lens that acts in strict conformity with the Gaussian theory of lenses, and that has identically the same said 3-conjugate-pair set of object and image plane positions GG', HH', KK', as the given "real" lens.

Note 15.—The radial cam, as a focuser element for the non-tilted or normal object plane, has so far been treated of by me in my said Cases A, I, U, X, British, Y, Ab, Ae, Af, Ai, Aj, At, Au, present Bc and later Bd. In two of these fifteen cases, Case Ab and Case Af, the radial cam has a virtual sector angle that is equal to zero, and a velocity ratio that is constant; but in each of the thirteen other cases, its virtual sector angle is finite, and its velocity ratio is varying. Case Ai is the only one in the series which does not make, to the art, some important contribution that is not found in an earlier case of the series.

What I claim as my invention and desire to secure by Letters Patent is:

1. (Allowed April 5, 1918, as claim 1 of my said Case Ai.) The combination with a photographic camera comprising relatively movable parts adapted to be relatively moved to set the camera in focus on an object point in the camera field, of an optical focuser for said camera consisting in means for sighting virtually from two laterally separated stations on the camera convergingly onto the same said object point of the camera field; said focuser comprising a pivoted mirror, also a radial cam pivoted to one side of said pivoted mirror, and mechanism connecting said mirror and radial cam to cause said cam to rotate twice as fast as the mirror.

2. (Allowed April 5, 1918, as claim 3 of my said Case Ai.) The combination with a photographic camera comprising relatively movable parts adapted to be relatively moved to set the camera in focus on an object point in the camera field, of an optical focuser therefor, said focuser being of the radial cam type and having a mirror pivoted at A, also a first radial cam rigidly connected to said mirror to rotate therewith, and a second radial cam pivoted at a different point A', and having a wrist pin $t$ whose distance $tA'$ from center A' is equal to the distance AA' between the two centers A and A', said wrist pin having engagement with the first radial cam, whereby the velocity ratio of the two radial cams is made exactly equal to 2.

3. (Allowed April 5, 1918, as claim 4 of my said Case Ai.) The combination with a photographic camera comprising relatively movable parts adapted to be relatively moved to set the camera in focus on an object point in the camera field, of an optical focuser therefor, said focuser being of the type that sights virtually from two laterally separated stations on the camera onto one same object point to be focused on, and means for varying the lateral separation of said sighting stations as may be required to suit the particular camera lens used.

4. (Allowed April 5, 1918, as claim 5 of my said Case Ai.) The combination with a folding photographic camera comprising when opened up for use relatively movable parts adapted to be relatively moved to set the camera in focus on an object point in the camera field, of an optical focuser mechanically connected with the said relatively movable camera parts, said focuser comprising a radial cam with a non-radial extension which automatically enters into operation when the camera is being folded to bring the focuser parts automatically into a safe folded position.

In testimony whereof, I have signed my name to this specification in the presence of Mrs. Mary E. Smoot.

JOSEPH BECKER.

Witness:
MARY E. SMOOT.